United States Patent
Choe et al.

(10) Patent No.: US 12,248,700 B2
(45) Date of Patent: Mar. 11, 2025

(54) STORAGE SYSTEM UTILIZING TRANSACTION LAYER PACKET CONTAINED STEERING INFORMATION

(71) Applicant: SAMSUNG ELECTRONICS CO., LTD., Suwon-si (KR)

(72) Inventors: Hyeokjun Choe, Hwaseong-si (KR); Jeongho Lee, Gwacheon-si (KR); Younggeon Yoo, Seoul (KR); Wonseb Jeong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 210 days.

(21) Appl. No.: 17/852,022

(22) Filed: Jun. 28, 2022

(65) Prior Publication Data

US 2023/0266917 A1    Aug. 24, 2023

(30) Foreign Application Priority Data

Feb. 23, 2022  (KR) ........................ 10-2022-0023367

(51) Int. Cl.
    *G06F 3/06*    (2006.01)
(52) U.S. Cl.
    CPC .......... *G06F 3/0656* (2013.01); *G06F 3/0604* (2013.01); *G06F 3/0659* (2013.01); *G06F 3/0679* (2013.01)
(58) Field of Classification Search
    None
    See application file for complete search history.

(56) References Cited

U.S. PATENT DOCUMENTS

| | | | |
|---|---|---|---|
| 8,397,023 B2 | 3/2013 | Baderdinni et al. |
| 9,092,337 B2 | 7/2015 | Nellans et al. |
| 9,395,921 B2 | 7/2016 | Lu |
| 9,563,382 B2 | 2/2017 | Hahn et al. |
| 9,672,148 B1 | 6/2017 | Michaud et al. |
| 9,710,167 B2 | 7/2017 | Liu et al. |
| 10,048,899 B2 | 8/2018 | Hwang et al. |
| 10,275,378 B2 | 4/2019 | Benisty |
| 10,459,844 B2 | 10/2019 | Benisty et al. |
| 10,824,335 B2 | 11/2020 | Rostoker et al. |
| 10,866,737 B2 | 12/2020 | Ramalingam et al. |
| 2006/0090016 A1 | 4/2006 | Edirisooriya |
| 2006/0095674 A1* | 5/2006 | Twomey ............. G06F 9/30181 712/E9.055 |
| 2018/0107614 A1* | 4/2018 | Hong ................... G06F 13/1642 |

(Continued)

*Primary Examiner* — Arpan P. Savla
*Assistant Examiner* — Edmund H Kwong
(74) *Attorney, Agent, or Firm* — Fish & Richardson P.C.

(57) ABSTRACT

A storage system includes a host and a storage device. The host includes a host processor and a host memory buffer, wherein the host processor includes a CPU core controlling operation of the host and a cache dedicated for use by the CPU core. The host memory buffer includes a submission queue and a completion queue. The storage device is connected to the host through a link and communicates with the host using a transaction layer packet (TLP). The storage device includes a nonvolatile memory device (NVM) and a storage controller, wherein the host writes a nonvolatile memory express (NVMe) command indicating a destination to the submission queue, and the storage controller reads data from the NVM, directly accesses the cache in response to destination information associated with the destination, and stores the read data in the cache.

17 Claims, 28 Drawing Sheets

(56) References Cited

U.S. PATENT DOCUMENTS

| | | | |
|---|---|---|---|
| 2019/0303294 A1* | 10/2019 | Heirman | G06F 12/0815 |
| 2020/0192802 A1* | 6/2020 | Ng | G06F 12/0811 |
| 2020/0326890 A1* | 10/2020 | Benisty | G06F 3/0611 |
| 2021/0117333 A1* | 4/2021 | Qureshi | G06F 3/0659 |
| 2021/0255977 A1 | 8/2021 | Kiyota et al. | |
| 2022/0350755 A1* | 11/2022 | Hahn | G06F 13/4295 |
| 2023/0161502 A1* | 5/2023 | Su | G06F 3/0679 |
| | | | 711/154 |
| 2023/0195635 A1* | 6/2023 | Balasubramani | G06F 12/0882 |

* cited by examiner

FIG. 12

| Fmt[2:0] | TLP Format |
|---|---|
| 000 | 3DW HEADER, NO DATA |
| 001 | 4DW HEADER, NO DATA |
| 010 | 3DW HEADER, with DATA |
| 011 | 4DW HEADER, with DATA |
| 100 | TLP Prefix |

FIG. 13

| TLP TYPE | Fmt[2:0] | Type[4:0] | Description |
|---|---|---|---|
| MRd | 000<br>001 | 00000 | Memory Read Request |
| MWr | 010<br>011 | 00000 | Memory Write Request |

FIG. 14

| PH[1:0] | Processing Hint |
|---------|-----------------|
| 00 | Bi-directional data structure |
| 01 | Requester |
| 10 | Target |
| 11 | Target with Priority |

131

NVMe Read Command

| Command Dword (CDW) | Brief Description |
|---|---|
| CDW0 | CID/PSDT/FUSE |
| CDW1 | NSID |
| CDW2~CDW3 | Reserved |
| CDW4~CDW5 | MPTR |
| CDW6~CDW9 | DPTR |
| CDW10~CDW11 | SLBA |
| CDW12 | LR/FUA/PRINFO/NLB |
| CDW13 | {bit[31:08] Reserved}/DSM ←--PH,ST |
| CDW14 | EILBRT |
| CDW15 | ELBATM/ELBAT |

FIG. 22

TDI

| DTA | CLD1 | CLD2 | CLD3 | CLD4 | CLD5 | CLD6 | CLD7 | CLD8 |
|-----|------|------|------|------|------|------|------|------|
| BM  | 0    | 0    | 0    | 0    | 0    | 0    | 1    | 0    |

STORAGE SYSTEM UTILIZING TRANSACTION LAYER PACKET CONTAINED STEERING INFORMATION

CROSS-REFERENCE TO RELATED APPLICATION

This U.S. patent application claims priority under 35 USC § 119 to Korean Patent Application No. 10-2022-0023367 filed on Feb. 23, 2022 in the Korean Intellectual Property Office, the subject matter of which is hereby incorporated by reference in its entirety.

BACKGROUND

1. Technical Field

Embodiments of the inventive concept relate generally to semiconductor integrated circuits, and more particularly to storage systems capable of directly accessing a processor cache of a host.

2. Discussion of the Related Art

One or more semiconductor memory devices may be used in variously embodied data storage devices. Some data storage devices include one or more solid state drives (SSDs). Such data storage devices exhibit design and/or performance advantages over devices including one or more hard disk drives (HDDs). In this regard, data storage devices including SSDs have no moving mechanical parts, provide higher data access speeds with improved stability and durability, and/or require reduced overall power consumption. Many contemporary and emerging applications exist for data storage devices including SSDs, such as for example; personal computers, laptop computers, vehicles like automobiles, trucks, airplanes, and drones, appliances, personal digital platforms, communication system nodes, medical equipment, etc., Those skilled in the art will recognize a variety of approaches or methodologies, for communicating (e.g., transmitting and/or receiving) data between systems, components, devices, such as input/output (I/O) devices, memories and/or caches. Ready examples of these approaches include, for example; direct memory access (DMA), direct cache access (DCA), and data direct I/O (DDIO).

SUMMARY

Embodiments of the inventive concept provide storage systems capable of directly, and more efficiently, writing data requested by a host in a central processing unit (CPU) cache.

According to some embodiments, a storage system includes; a host, wherein the host includes a host processor and a host memory buffer, the host processor including a central processing unit (CPU) core controlling operation of the host and a cache dedicated for use by the CPU core, and the host memory buffer including a submission queue and a completion queue, and a storage device connected to the host through a link, communicating with the host using a transaction layer packet (TLP), and including at least one nonvolatile memory device (NVM) and a storage controller controlling the NVM. The host is configured to write a nonvolatile memory express (NVMe) command indicating a destination to the submission queue, and the storage controller is configured to read data from the NVM, directly access the cache in response to destination information associated with the destination, and store the read data in the cache.

According to some embodiments, a storage system includes; a host, and a storage device connected with the host through a link, wherein the storage device communicates with the host using a transaction layer packet (TLP). The host includes; a host processor configured to control operation of the host, the host processor including a central processing unit (CPU) core and a cache dedicated to the CPU core, wherein the cache is swapped based on a unit of a cache line, and a host memory buffer including a submission queue and a completion queue. The storage device includes; at least one nonvolatile memory device (NVM) configured to store data, and a storage controller configured to control operation the NVM, wherein, in response to a nonvolatile memory express (NVMe) command received from the host corresponding to a read command requesting a partial update of the cache, the storage controller is configured to read corresponding data from the NVM, provide the cache with target data corresponding to data to be updated from among the read data, and provide the host memory buffer with non-target data from among the read data, excepting the target data.

According to some embodiments, a storage system includes; a host, and a storage device connected with the host through a peripheral component interconnect express (PCIe) link, wherein the storage device communicates with the host using a transaction layer packet (TLP). The host includes; a host processor configured to control an operation of the host, wherein the host processor includes a central processing unit (CPU) core and a cache dedicated to the CPU core, a host memory buffer including a submission queue, and a root complex connected to the host processor and the host memory buffer. The storage device includes; at least one nonvolatile memory device (NVM) configured to store data, and a storage controller configured to control the NVM, wherein, in response to a nonvolatile memory express (NVMe) command received from the host and a destination associated with the NVMe command corresponding to the cache, the storage controller is configured to read data from the NVM, access the cache through the root complex, and store the read data in the cache, and in response to a cache miss indicating an update of data that is stored in the cache occurring or in response to a new data, which is not stored in the cache or in the host memory buffer, to be requested, the host processor is configured to set destination information associated with the destination in a portion of the NVMe command, and store the NVMe command in the submission queue.

According to some embodiments, in a storage system when data stored in the CPU cache is to be updated or a new data is to be stored in the CPU cache, the data may include destination information associated with the data to be updated or the new data and in the TLP and may update at least a portion of the data stored in the cache or may store the new data in the cache by directly accessing the cache to increase cache hit rate and to enhance performance In addition, when data stored in the host memory buffer is to be updated or a new data is to be stored in the host memory buffer, the storage system may DMA the data to be updated or the new data to prevent increase of use of memory bandwidth and increase of latency.

BRIEF DESCRIPTION OF THE DRAWINGS

Advantages, benefits and features, as well as the making and use of the inventive concept may be more clearly understood upon consideration of the following detailed description together with the accompanying drawings, in which:

FIG. 12 is a table listing formats for the TLP according to encoding of the format Fmt field of the PCIe request header format of FIG. 9 or FIG. 10;

FIG. 13 is a table listing a type of the TLP according to encoding of the format field and the type field of the PCIe request header format of FIG. 9 or FIG. 10;

FIG. 14 is a table listing data access pattern of the TLP according to encoding of the processing hint of the PCIe request header format of FIG. 9 or FIG. 10;

FIG. 22 is a conceptual diagram illustrating an example of target data information included in the TLP of FIG. 20;

DETAILED DESCRIPTION

Throughout the written description and drawings, like reference numbers and labels are used to denote like or similar elements, components, features and/or method steps.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation, etc., in order to provide a thorough understanding of the inventive concept. However, those skilled in the art will appreciate that these numerous specific details are merely teaching examples, and may not be required to realize all every aspect of the inventive concept.

As an example of various conventionally-understood and commercially-available technical standards, certain illustrated embodiments described hereafter assume the use (or configuration) of the Peripheral Component Interconnect (PCI) express (PCIe). One goal of PCIe is enabling components and devices from different vendors to inter-operate using a reasonably open architecture, spanning multiple market segments, such as for example; clients (e.g., desktop and mobile platforms), servers (e.g., standard and enterprise), embedded and communication devices, etc. In this regard, PCIe provides a high performance, general purpose I/O scheme usefully applicable to a wide variety of contemporary and emerging computational and communications platforms.

Some PCIe attributes, such as usage model, load-store architecture, and software interfaces, have been maintained through a number of revisions, whereas previous parallel bus implementations have been replaced by highly scalable, fully serial interfaces. More recent versions of PCIe take advantage of advances in point-to-point interconnects, switch-based technologies, and packetized protocols to deliver improved levels of performance and expanded features. Here, Power Management, Quality of Service (QoS), Hot-Plug/Hot-Swap support, Data Integrity, Error Handling and Credit-based Flow Control are just some of the advanced features supported by recent versions of PCIe.

Figure 1:
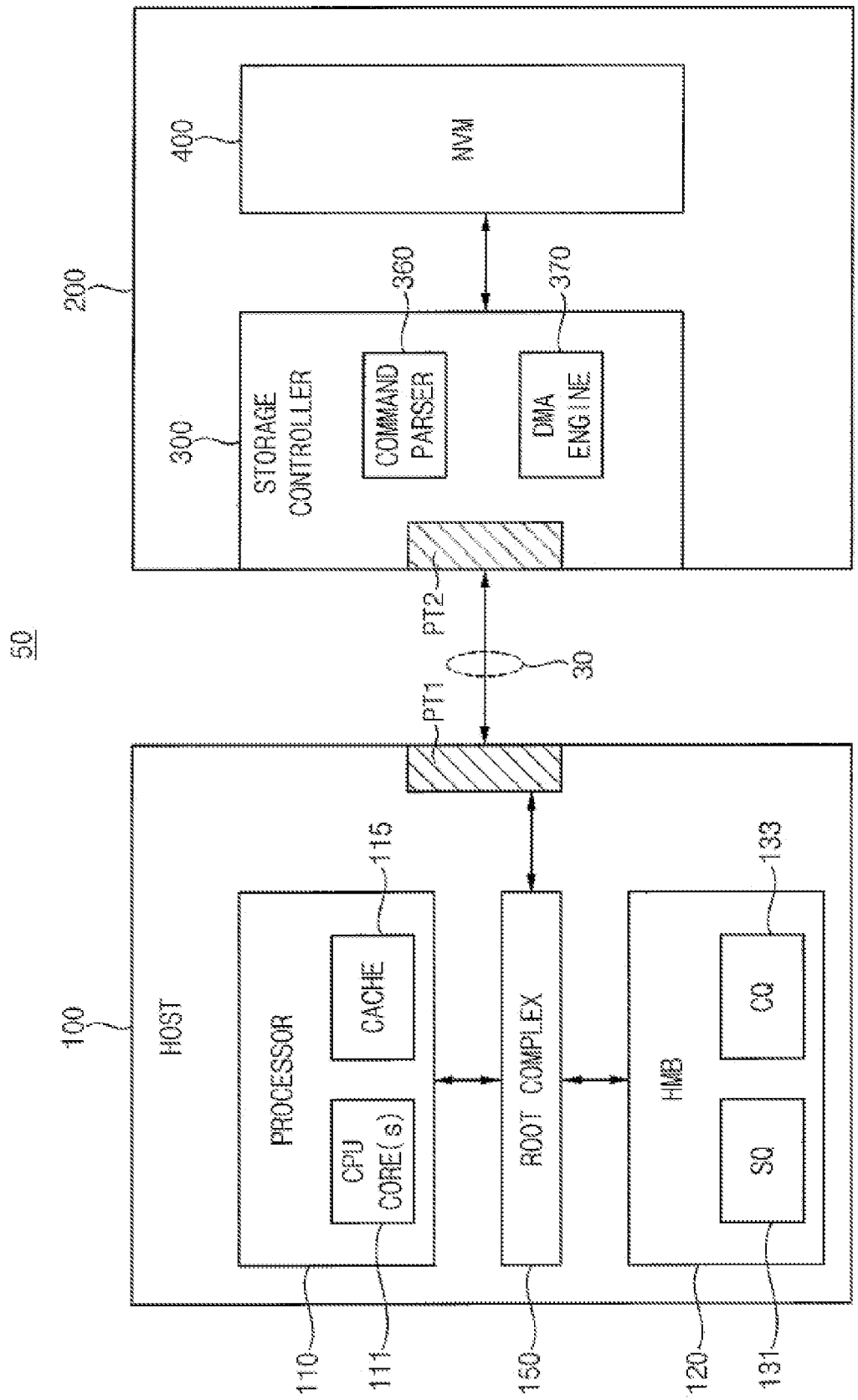
FIG. 1 is a block diagram illustrating a storage system according to embodiments of the inventive concept.

FIG. 1 is a block diagram illustrating a storage system 50 according to embodiments of the inventive concept.

Referring to FIG. 1, the storage system 50 may generally include a host 100 and a storage device 200 connected through a link 30 (e.g., a peripheral component interconnect express (PCIe) link conforming to PCIe standards).

The host 100 may control overall operations of the storage system 50. For example, the host 100 may store data in the storage device 200 or may read data from the storage device 200. A first port PT1 associated with the host 100 may be used communicate (e.g., send and/or receive various signals) with a second port PT2 associated with the storage device 200. In some embodiments, each of the first port PT1 and the second port PT2 may be a physical port providing connection in accordance with a PCIe protocol, however the inventive concept is not limited thereto. Further, the storage device 12 may be a nonvolatile memory express (NVMe) device configured to operate in accordance with a NVMe interface, however the inventive concept is not limited thereto.

The host 100 may include a processor 110, a host memory buffer (HMB) 120 and a root complex 150.

The processor 110 may be referred to as a host processor and may include one or more Central Processing Unit (CPU) core(s) 111 and a cache dedicated to the operation of the CPU core(s) 111.

The HMB 120 may include a submission queue SQ 121 and a completion queue CQ 123. The submission queue 121 may be implemented as dedicated storage that stores a command to-be-provided to the storage device 200, and the completion queue 123 may be implemented as dedicated storage that stores completion information related to an operation completed in the storage device 200 in response to the command. Here, in some embodiments, the command stored in the submission queue 121 may be defined in accordance with a NVMe specification.

The root complex 150 may be connected to the processor 110 and the HMB 120.

The storage device 200 may include a storage controller 300 and at least one Nonvolatile Memory Device (NVM) 400. In some embodiments, the storage controller 300 may be a NVMe device operating in accordance with an NVMe interface. That is, the storage controller 300 may be configured to communicate with the host 100 in a predefined manner consistent with the NVMe interface.

The NVM 400 may operate under control of the storage controller 300, and in some embodiments the NVM 400 may be implemented as a NAND flash memory device, however the inventive concept is not limited thereto.

The storage controller 300 may include a command parser 360 and a direct memory access (DMA) engine 370.

The command parser 360 may parse the command from the host 100 and may provide the parsed command to the NVM 400, and the DMA engine 370 may control memory access to the NVM 400 and/or the HMB 120.

In some embodiments, the host 100 and the storage device 200 may be connected through a PCIe link 30 in accordance with PCIe standards.

Hereinafter, embodiments of the inventive concept will be described in the relation to an exemplary configuration including one host and one storage device. However, those skilled in the art will appreciate that embodiments of the inventive concept may also be applied to configurations including multiple transceiver devices performing bi-directional communication.

Figure 2:
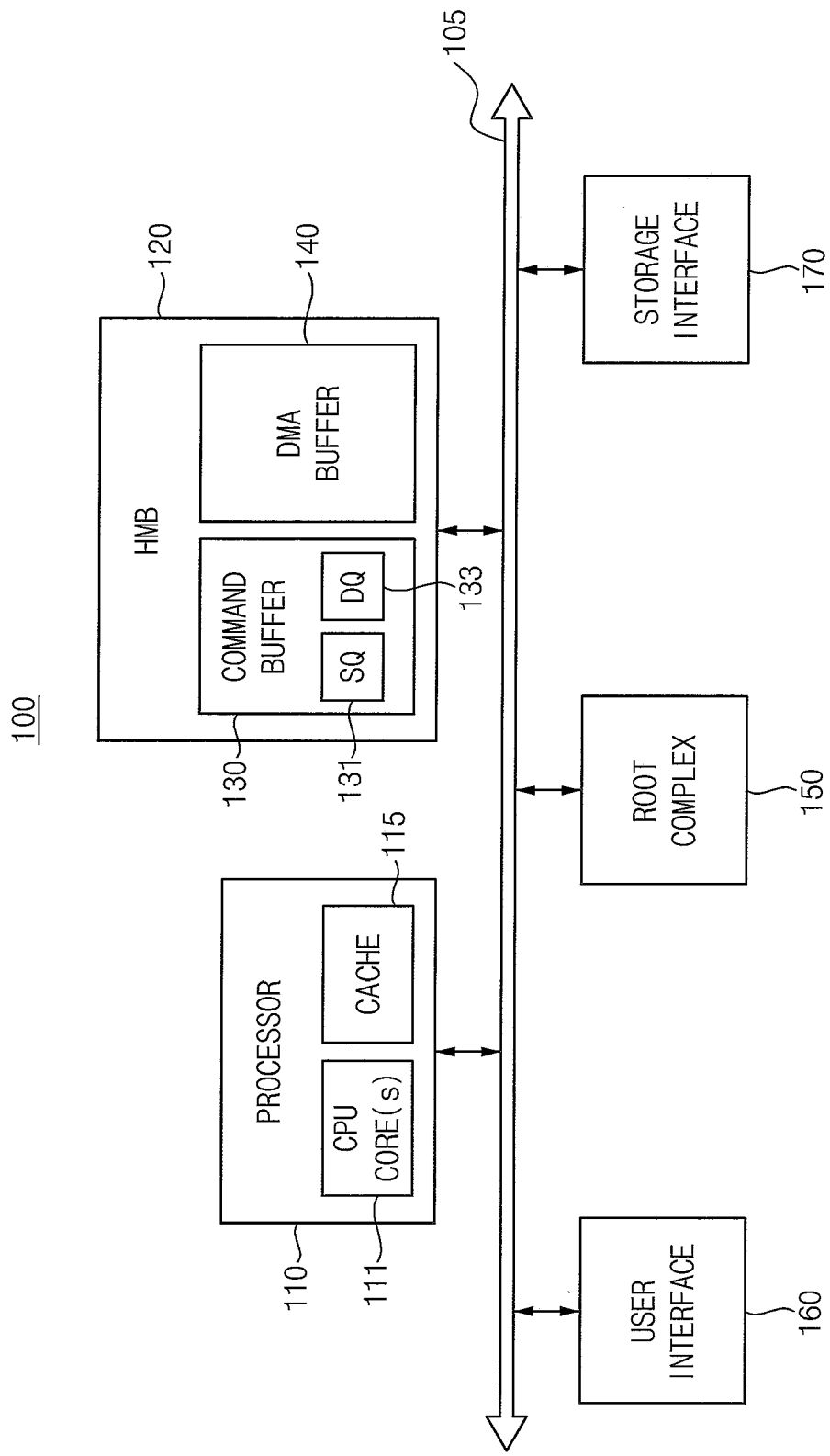
FIG. 2 is a block diagram further illustrating in one example the host in the storage system of FIG. 1.

FIG. 2 is a block diagram further illustrating in one example the host 100 of FIG. 1.

Referring to FIG. 2, the host 100 may include the processor 110, the HMB 120, the root complex 150, as well as a user interface (I/F) 160 and a storage interface (I/F) 170.

The foregoing components, potentially among others, may be interconnected by a bus 105. Here, the bus 105 may be understood as one or more transmission channel(s) through which data may be variously communicated between the processor 110, the HMB 120, the root complex 150, the user interface 160 and the storage interface 170.

The processor 100, including include the CPU core(s) 111 and the cache 115, may be used to generate a command and may receive completion information associated with completion of an operation associated indicated by the command.

In some embodiments, the HMB 120 may include a command buffer 130 and a DMA buffer 140. The command buffer 130 may include the submission queue 131 and the completion queue 133. The DMA buffer 140 may be used to store data to-be-processed in accordance with a DMA transmission, wherein the DMA transmission may be communicated without intervention by the CPU core(s) 111.

The user interface 160 may be configured to enable communicate with the host 100, and the storage interface 170 may be configured to communicate with the storage device 200. Each of the user interface 160 and the storage interface 170 may be include physical and/or virtual medium capable of communicating data and related signals. Accordingly, each of the user interface 160 and the storage interface 170 may be variously implemented using hardware and/or software.

Figure 3:
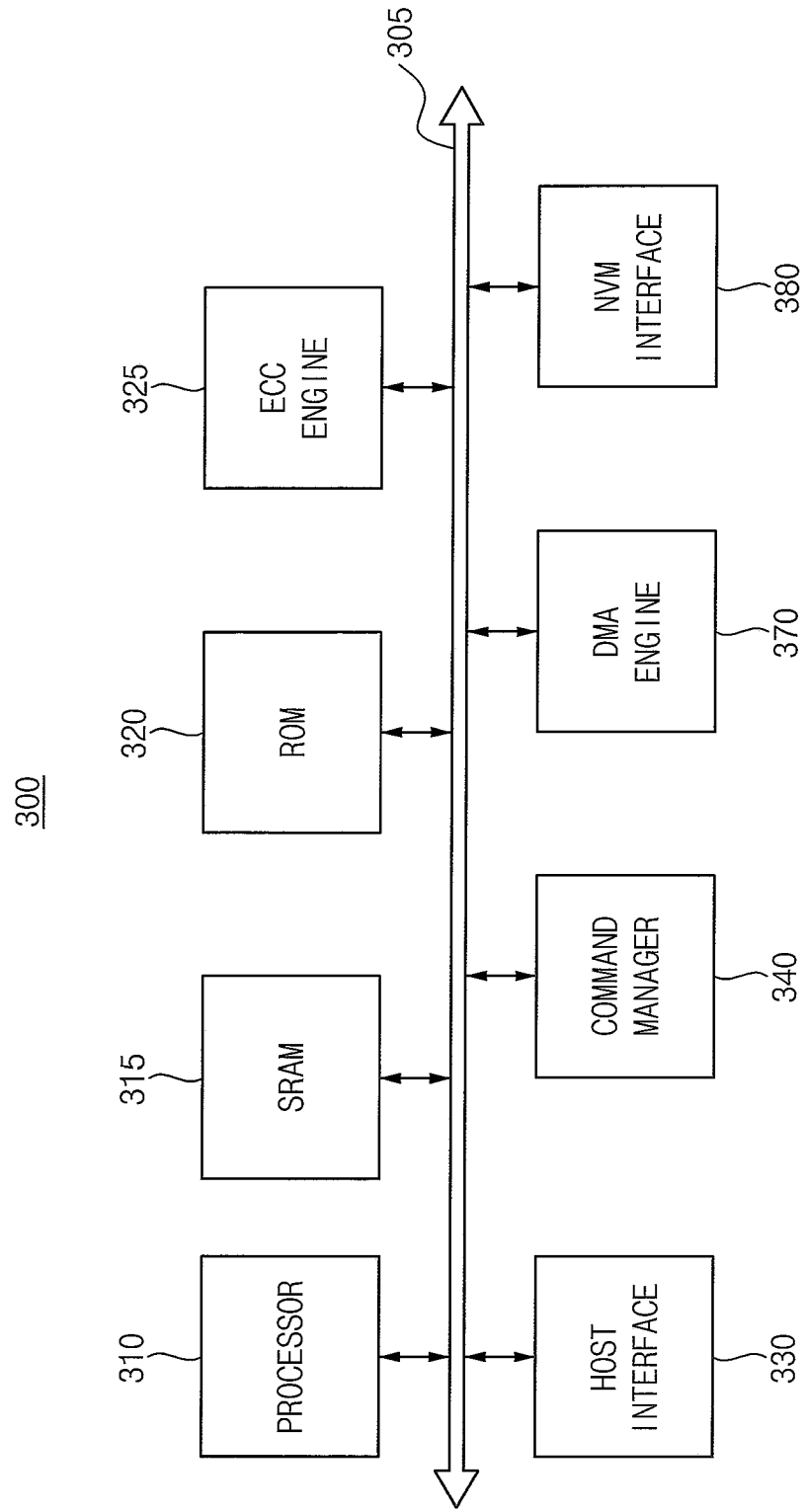
FIG. 3 is a block diagram further illustrating in one example the storage controller in the storage system of FIG. 1.

FIG. 3 is a block diagram further illustrating in one example the storage controller 300 of FIG. 1.

Referring to FIG. 3, the storage controller 300 may include the DMA engine 370, as well as a processor 310, a Synchronous Random Access Memory (RAM) (SRAM) 315, a Read Only Memory (ROM) 320, an error correction code (ECC) engine 325, a host interface 330, a command manager 340, and a NVM interface 380. These components may be interconnected using a bus 305.

The processor 310 may be used to control overall operation of the storage controller 300. The SRAM 315 may be used to store various application programs executable by the processor 310. Further, the SRAM 315 may operate as a buffer memory, a cache memory and/or a working memory in relation to the processor 310. The ECC engine 325 may be used to detect and/or correct errors occurring in data read from the NVM 400.

The command manager 340 may be used to manage command(s) received from the host 100. The DMA engine 370 may be used to control DMA operation(s) in response to DMA command(s) received from the host 100.

In some embodiments, the command manager 340 and the DMA engine 370 may be implemented using software and/or hardware. The ROM 320 may be used to store operating method(s) associated with the command manager 340 and/or operating method(s) associated with the DMA engine 370. Here, the processor 310 may be used to control operation of the command manager 340 and the DMA engine 370

The storage controller 300 may communicate with the host 100 through the host interface 330. For example, the host interface 330 may be configured to communicate completion information in accordance with the NVMe interface. In addition, the host interface 330 may be configured to communicate with the host 100 in response to a DMA transmission.

The storage controller 300 may communicate with the NVM 400 through the NVM interface 380. For example, the NVM interface 380 may be configured to communicate with the NVM 400 in response to a DMA transmission.

Figure 4:
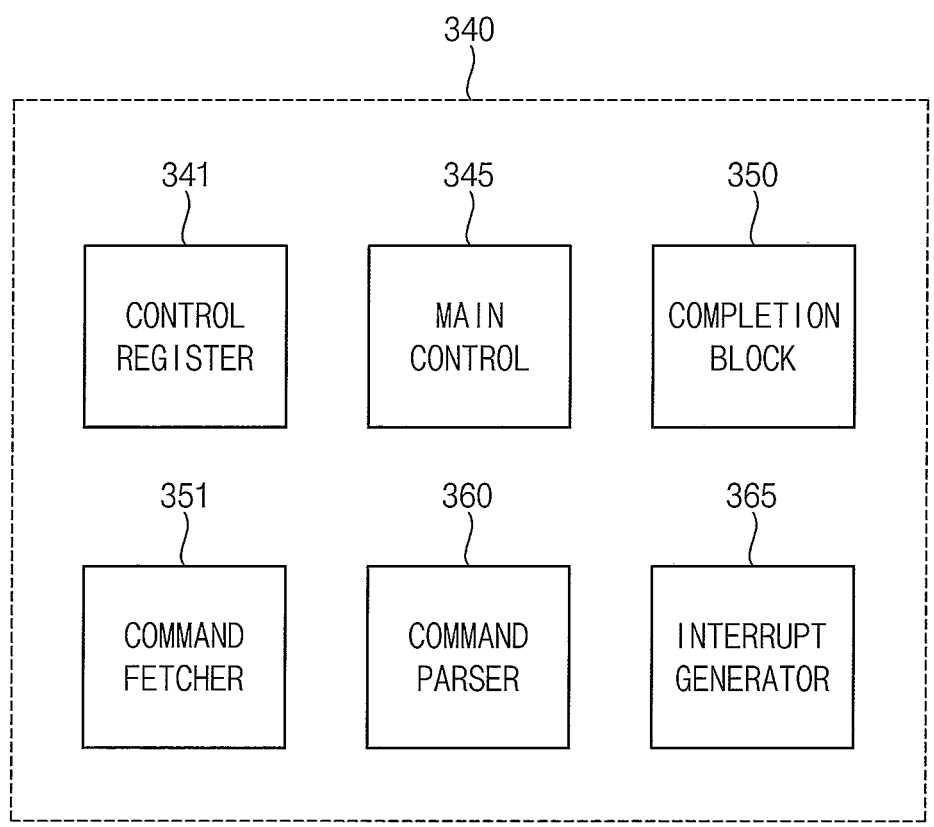
FIG. 4 is a block diagram further illustrating in one example the command manager in the storage controller of FIG. 3.

FIG. 4 is a block diagram further illustrating in one example the command manager 340 of FIG. 3.

Referring to FIG. 4, the command manager 340 may include the command parser 360, as well as a control register block 341, a main control block 345, a completion block 350, a command fetch block 351, and an interrupt generator 365.

The control register block 341 may be include a register configured to be defined (or "set") by the host 100 and/or configured to process one or more operations recognizing a register value, as set by the host 100. For example, the control register block 341 may include various registers defining information provided from the host 100. The host 100 may notify the command manager 340 of various information by setting a register value of the control register block 341.

The command fetch block 351 may be used to perform (or process) one or more operations associated with fetching a command stored in the submission queue 131 of the host 100. For example, the command fetch block 351 may communicate a memory read request to the host 100 and receive a command stored in the submission queue 131 from the host 100.

The main control block 351 may be used to control overall operation of the command manager 340 ad/or process one or more operations to-be-performed in the command manager 340.

The command parser 360 may be used to parse a command received from the host 100 and in order to provide a parsed command to the NVM 400 through the NVM interface 380.

The completion block 350 may be used to process one or more operations associated with writing completion information indicating completion of an operation to the completion queue 133 of the host 100. For example, when an operation responsive to a command fetched from the host 100 is completed, the completion block 350 may write the completion information indicating completion of the to the completion queue 133 of the host 100.

The interrupt generator 365 may be used to process one or more operations providing an interrupt signal to the host 100. For example, after the completion block 350 writes the completion information to the completion queue 133, the interrupt generator 365 may notify the host 100 that the completion information has been written to the completion queue 133 by providing the interrupt signal to the host 100. In some embodiments, the interrupt signal may be provided using one or more signaling approaches, such as pin-based interrupt, message signaled interrupts (MSI), MSI-X, etc.

Figure 5:
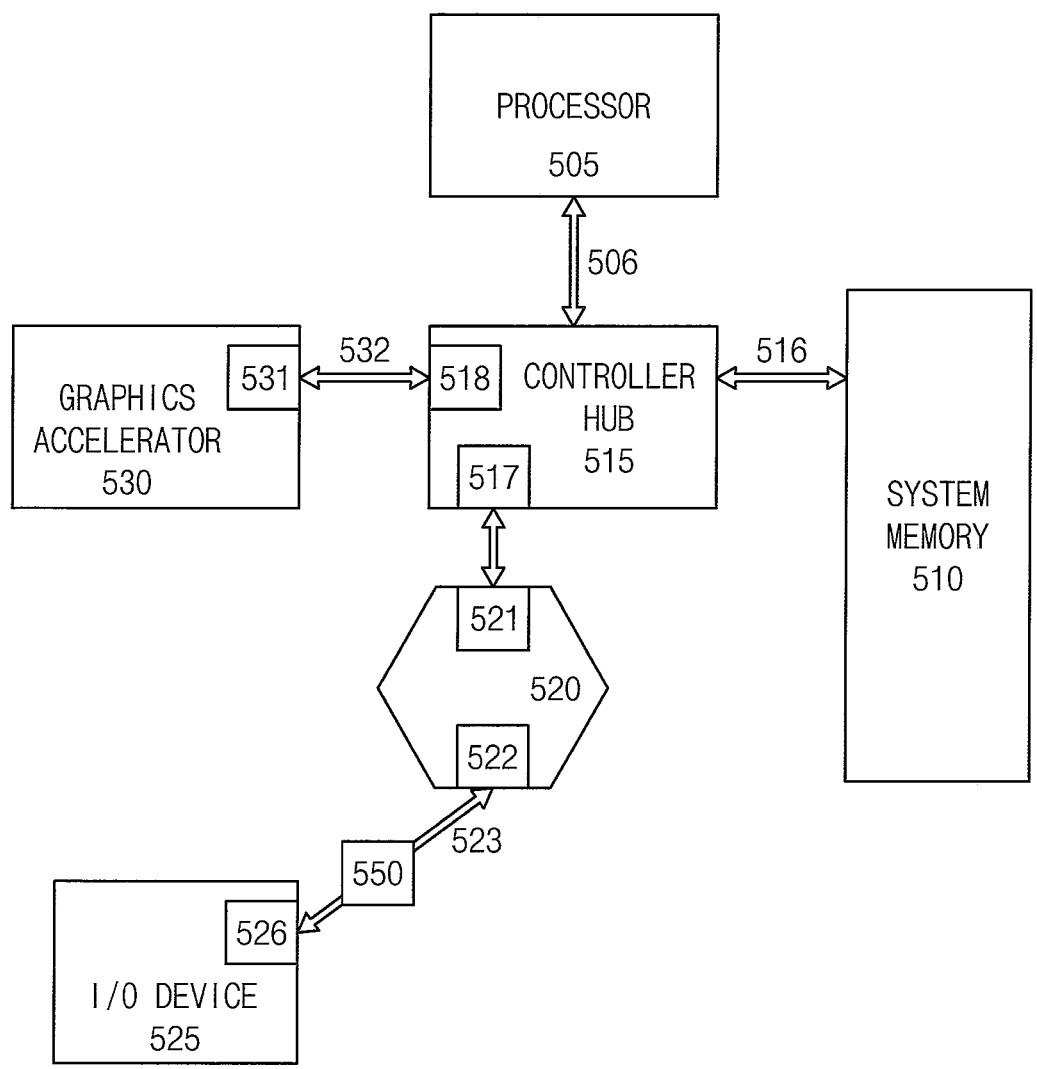
FIG. 5 is a conceptual diagram illustrating a system including an interconnect architecture according to embodiments of the inventive concept.

FIG. 5 is a conceptual diagram illustrating an interconnect architecture for a system 500 according to embodiments of the inventive concept. Here, FIG. 5 may be understood as illustrating an interconnection fabric including a number of point-to-point links variously interconnecting system components.

The system 500 may include a processor 505 and a system memory 510 interconnected through a controller hub 515. In this regard, the processor 505 may be any type of data processing element, such as a microprocessor, a host processor, an embedded processor, a co-processor, etc. In this regard, the processor 505 may be connected to the controller hub 515 through a front-side bus (FSB) 506. In some embodiments, the FSB 506 may be a serial point-to-point interconnect as described in some additional detail hereafter. Alternately, the FSB 506 may include a serial, differential interconnect architecture defined in accordance with one or more conventionally-understood interconnection standard(s).

The system memory 510 may include one or more memory device, such as a volatile memory, a non-volatile memory, a solid state memory, etc. The system memory 510 may be connected to the controller hub 515 through a memory interface 516. Here, the memory interface 516 may be configured as a double-data rate (DDR) memory interface, a dual-channel DDR memory interface, a dynamic RAM (DRAM) memory interface, etc.

In some embodiments, the controller hub 515 may be is a root hub, root complex, or root controller configured in accordance with a PCIe interconnection hierarchy. Ready examples of the controller hub 515 include; a chipset, a memory controller hub (MCH), a north-bridge, a south bridge, an interconnect controller hub (ICH), a root controller/hub, etc. Here, the term "chipset" denotes two or more physically separate controller hubs (e.g., a memory controller hub (MCH) coupled to an interconnect controller hub (ICH)). In some embodiments, the system 500 may include the MCH integrated with the processor 505, wherein the controller hub 515 is configured to communicate with various I/O devices, as described hereafter in some additional detail. Further in this regard, peer-to-peer routing may be optionally supported through the root complex and/or the controller hub 515.

Referring to FIG. 5, the controller hub 515 may be further connected to a switch/bridge 520 through a serial link 519. Input/Output (I/O) modules 517 and 521 (interfaces 517 and 521, or ports 517 and 520) may be implemented as a layered protocol stack to provide communication between the controller hub 515 and the switch 520. In some embodiments, multiple devices may be capable of being connected to the switch/bridge 520.

The switch/bridge 520 may be used to route messages (e.g., packets) to a device 525, wherein the device 525 may be an upstream device (e.g., a device disposed towards a root complex to the controller hub 515) or downstream (e.g., a device disposed away from a root controller from the processor 505 or the system memory 510).

In some embodiments, the switch/bridge 520 may be implemented as a logical assembly of multiple virtual PCI-to-PCI bridge devices. The device 525 may include any internal or external interface 526 capable of being connected to electronic circuitry, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, or some other type of I/O device.

Using PCIe vernacular, such as device may also be referred to as an "endpoint." Although not specifically shown, the device 525 may include a PCIe to PCI/PCI-X bridge to support legacy or other version PCI devices. Endpoint devices in PCIe may be classified as legacy, PCIe, or root complex integrated endpoints.

A graphics accelerator 530 may also be connected to the controller hub 515 through a serial link 532. In some embodiments, the graphics accelerator 530 may be connected to an MCH which is coupled to an ICH. The switch/bridge 520, and accordingly the I/O device 525, may thus be connected to the ICH. Each of the I/O modules 531 and 518 may also be implemented as a layered protocol stack to communicate between the graphics accelerator 530 and the controller hub 515. In some embodiments, the graphics accelerator 530 may be integrated within the processor 505.

Of additional note, one or more of the components described in relation to FIG. 5, (e.g., 505, 510, 515, 520, 525 and 530) may be enhanced, or may include feature(s) associated with the description that follows.

Figure 6:
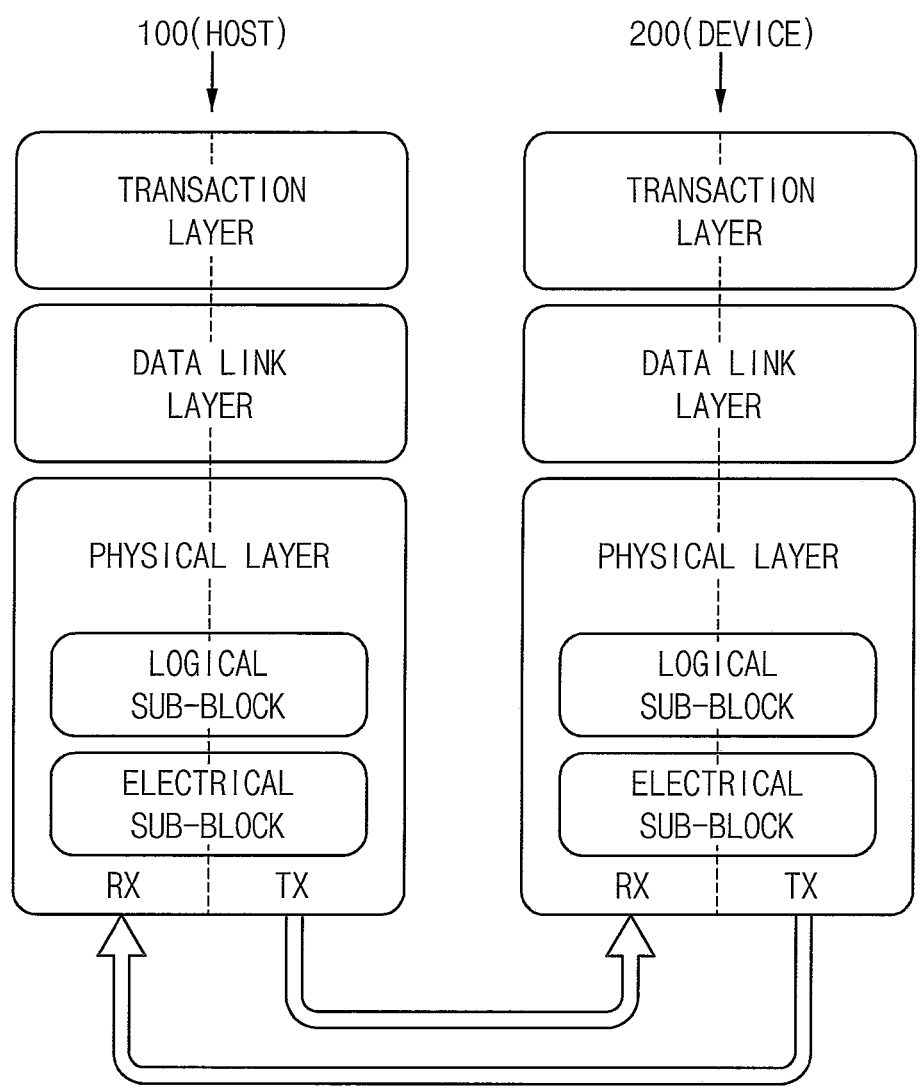
FIGS. 6 and 7 are respective, conceptual diagrams illustrating of an interconnect architecture for a system according to embodiments of the inventive concept.
Figure 7:
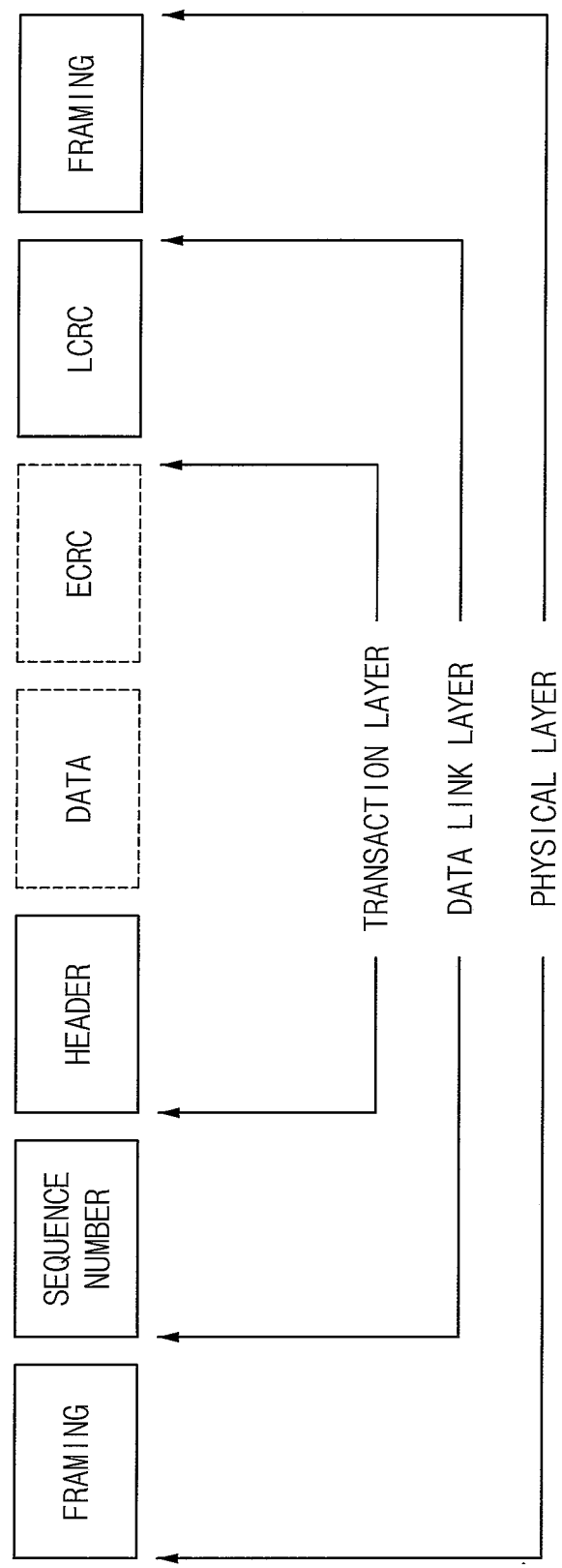

FIGS. 6 and 7 are respective, conceptual diagrams illustrating an interconnect architecture that may be applied to a system according to embodiments of the inventive concept.

Referring to FIGS. 6 and 7, a layered protocol stack is illustrated. Here, the layered protocol stack may include any form of layered communication stack, such as a Quick Path Interconnect (QPI) stack, a PCIe stack, a next generation high performance computing interconnect stack, or other layered stack. In this regard, although embodiments are described in relation to a PCIe stack, embodiments of the inventive concept may be applied to other types of interconnect stacks. In some embodiments, the protocol stack may be a PCIe protocol stack including a transaction layer, a data link layer, and a physical layer. An interface, such as the interfaces 517, 518, 521, 522, 526, and 531 shown in FIG. 5, may be represented as communication protocol stack. Representation as a communication protocol stack may also be referred to as a module or interface implementing/including a protocol stack.

The PCI Express uses packets to communicate information between components. The packets are formed in the transaction layer and the data Link Layer to carry the information from a transmitting component to a receiving component. As the transmitted packets flow through the other layers, they may be extended with additional information necessary to handle packets at various layers. At the receiving side the reverse process occurs and packets get transformed from their physical layer representation to the data link layer representation and finally (for transaction layer packets) to the form that may be processed by the transaction layer of the receiving device.

In some embodiments, the transaction layer provides an interface between a device's processing core and the interconnect architecture, such as the data link layer and the physical layer. In this regard, a primary responsibility of the transaction layer is the assembly and disassembly of packets (i.e., the transaction layer packets, or TLPs). The translation layer typically manages credit-based flow control for TLPs. The PCIe implements split transactions, i.e. transactions with request and response separated by time, allowing a link to carry other traffic while the target device gathers data for the response.

In addition the PCIe utilizes credit-based flow control. In this approach, a device advertises an initial amount of credit for each of the receive buffers in the transaction layer. An external device at the opposite end of the link, such as the controller hub 515 in FIG. 5, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In some embodiments, the transaction layer assembles packet header/payload. The payload may include data and an error detection code (e.g., ECRC). Possible format(s) for current packet headers/payloads may be understood upon consideration of conventionally-understood and commercially-available PCIe specification(s) (See, e.g., https://pcisig.com for additional background information).

The link layer, also referred to as the data link layer, acts as an intermediate stage between the transaction layer and the physical layer or the PHY layer. In some embodiments, the data link layer is responsible to provide a reliable mechanism exchanging the transaction layer packets (TLPs) between two components 100 (DEV1) and 200 (DEV2) through a link. One side of the data link layer accepts TLPs assembled by the transaction layer, applies packet sequence identifier, i.e. a sequence number, an identification number or a packet number, calculates and applies an error detection code (e.g., LCRC), and submits the modified TLPs to the physical layer for transmission across a physical to an external device.

In some embodiments, the physical layer includes a logical sub block and an electrical sub-block to physically transmit a packet to an external device. Here, the logical sub-block is responsible for the "digital" functions of the physical layer. In this regard, the logical sub-block includes a transmitter section to prepare outgoing information for transmission by the physical sub-block, and a receiver section to identify and prepare received information before passing it to the link layer.

The physical block includes a transmitter TX and a receiver RX. The transmitter TX is supplied by the logical sub-block with symbols, which the transmitter serializes and transmits onto to an external device. The receiver RX is supplied with serialized symbols from an external device and transforms the received signals into a bit-stream. The bit-stream is de-serialized and supplied to the logical sub-block. In one embodiment, an 8b/10b transmission code is employed, where ten-bit symbols are transmitted/received. Here, special symbols are used to frame a packet with frames. In addition, in one example, the receiver RX also provides a symbol clock recovered from the incoming serial stream.

As noted above, although the transaction layer, the link layer, and physical layer have been described in relation to a specific embodiment assuming use of a PCIe protocol stack, a layered protocol stack is not limited thereto, and other layered protocol(s) may be included or implemented.

Figure 8:
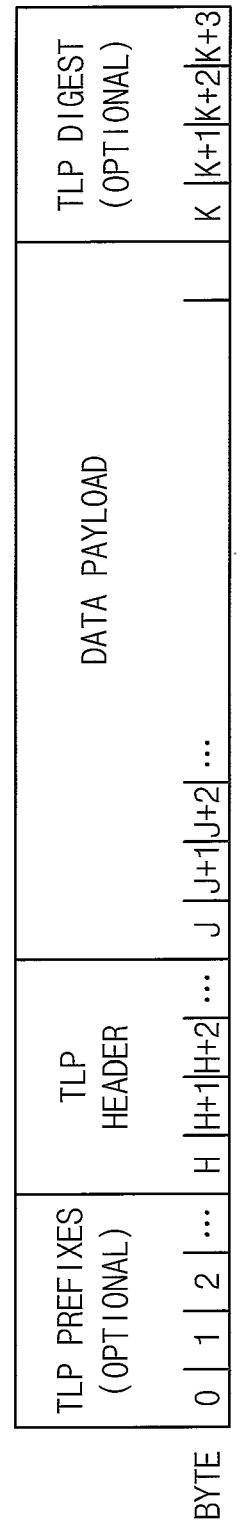
FIG. 8 is a conceptual diagram illustrating a packet that may be transferred between the host and the storage device included in the storage system according to embodiments of the inventive concept.

FIG. 8 is a conceptual diagram illustrating in one example a packet format for a packet that may be communicated between the host 100 and the storage device 200 of FIG. 1. Here, the format of a particular TLP may be generated and managed by the transaction layer of the PCIe architecture.

In this regard, a transaction may includes request(s) and completion(s) variously communicated using packets. As illustrated in FIG. 8, a TLP may include one or more optional TLP Prefixes, a TLP header, a data payload, and an optional TLP Digest, which are assigned to a plurality of bytes (BYTE 0~k+3).

Figure 9:
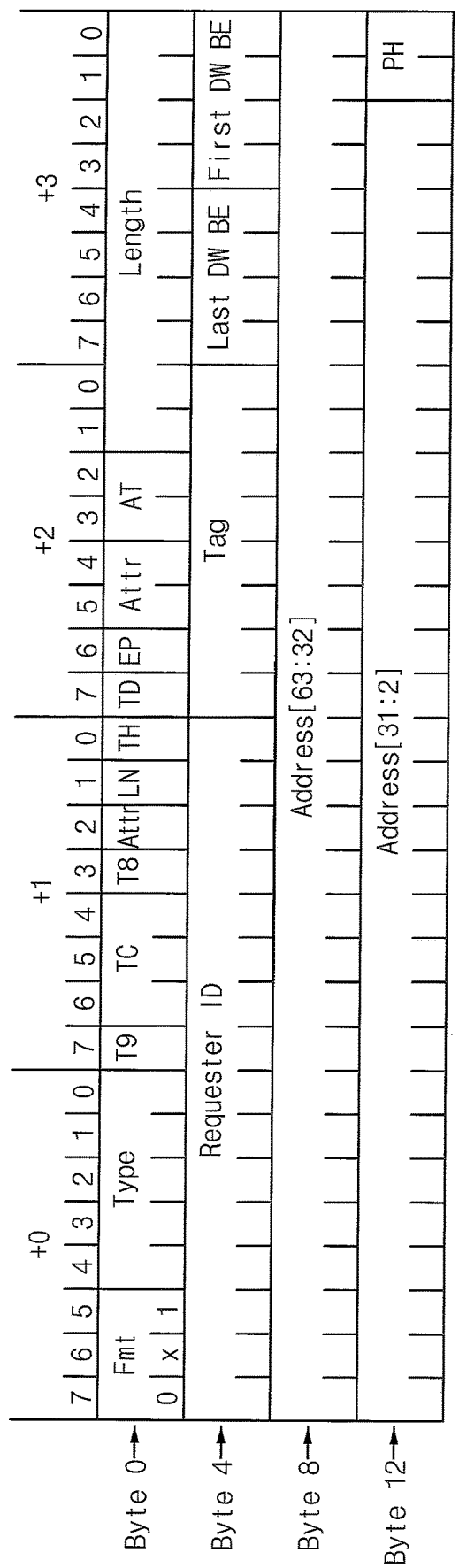
FIGS. 9 and 10 are respective, conceptual diagrams illustrating PCIe request header formats.
Figure 10:
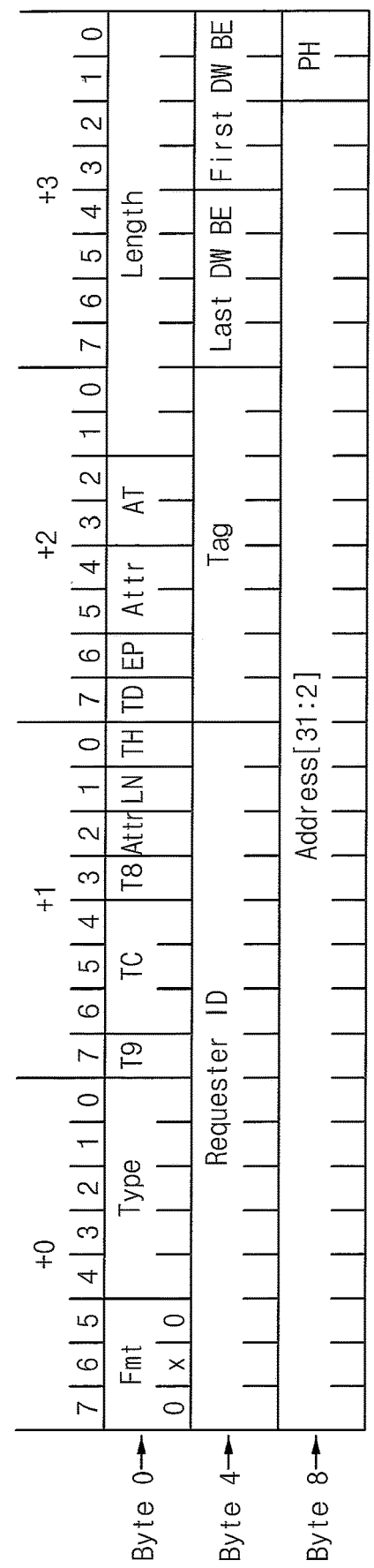

FIGS. 9 and 10 are respective, exemplary data structures further illustrating PCIe request header formats.

FIG. 9 illustrates a header format for a PCIe request header format for 64-bit addressing, including traditional PCIe TLP header fields such as a 3-bit Format Fmt field, 5-bit Type field, Traffic Class (TC) field, Lightweight Notifications (LN) bit, TLP Hint (TH) bit, TLP Digest (TD) field, Address Type (AT) field, Error Poisoned (EP) field, Attribute (Attr) fields, Length field, Requester ID field, and Address fields.

FIG. 10 illustrates a PCIe request header for 32-bit addressing with a format resembling the 64-bit addressing request header in FIG. 9, but including byte enable fields (e.g., first and last DW byte enable (BE) fields) and a processing hint (PH) field.

In relation to the illustrated examples of FIGS. 9 and 10, the Format Fmt field may indicate a format of the TLP and indicate whether a prefix exists, the Type field may indicate a type of the TLP, the TH bit may indicate whether TLP hint exists and the PH field may indicate data access pattern.

Figure 11:
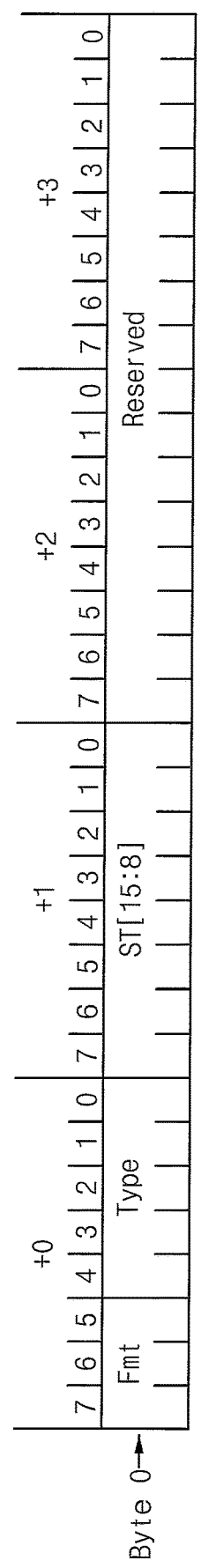
FIG. 11 is a conceptual diagram illustrating a prefix in the TLP.

FIG. 11 is an exemplary data structure further illustrating the prefix in a TLP.

Referring to FIG. 11, the prefix may include may include first through fourth bytes BYTE0~BYTE3, the first byte BYTE0 may include a format Fmt field and a type Type field, the second BYTE1 may include a 8-bit steering tag (ST) field and the third byte BYTE2 and the fourth field BYTE3 may be reserved.

FIG. 12 is a table listing formats for a TLP in accordance with encoding of the format Fmt field of the PCIe request header format of FIG. 9 or FIG. 10.

Referring to FIG. 12, the format Fmt field of '000' indicates 3 double-word (DW) header including no data, the format Fmt field of '001' indicates 4 DW header including no data, the format Fmt field of '010' indicates 3 DW header including data, the format Fmt field of '011' indicates 4 DW header including data and the format Fmt field of '100' indicates TLP prefix.

FIG. 13 is a table listing types of the TLP according to encoding of the format field and the type field of the PCIe request header format of FIG. 9 or FIG. 10.

Referring to FIG. 13, the format Fmt field of '000' or '001' and the type Type field of '00000' indicates that the TLP corresponds to memory read request denoted by MRd and the format Fmt field of '010' or '011' and the type Type field of '00000' indicates that the TLP corresponds to memory write request denoted by MWr.

FIG. 14 is a table listing a data access pattern for the TLP according to encoding of the processing hint of the PCIe request header format of FIG. 9 or FIG. 10.

Referring to FIG. 14, the PH of '00' indicates that frequent bi-directional data accesses occur by the host 100 and the storage device 200, the PH of '01' indicates frequent bi-directional data accesses occur by the storage device 200, the PH of '10' indicates frequent bi-directional data accesses occur by the host 100 and the PH of '11' indicates frequent bi-directional data accesses occur by the host 100 and the host 100 has a priority.

Figure 15:
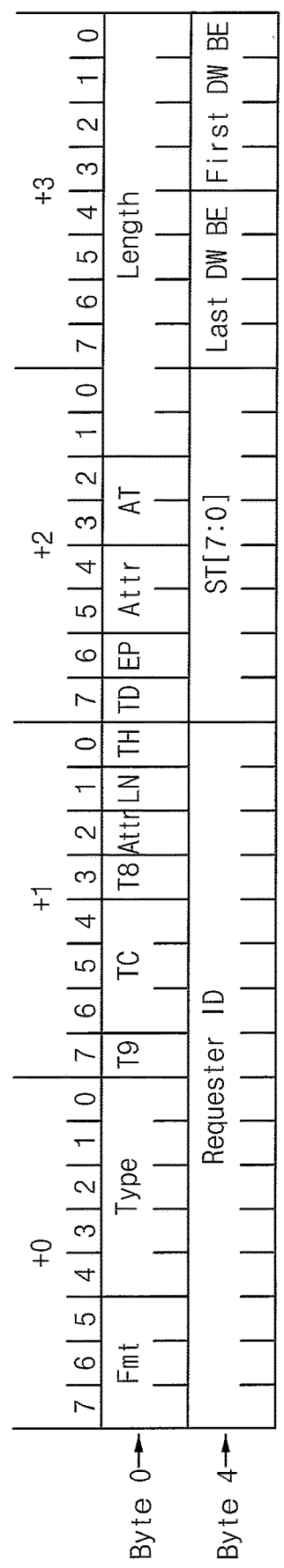
FIG. 15 is a conceptual diagram illustrating a location of the steering tag field in the memory write request header.

FIG. 15 is a conceptual diagram illustrating location of a steering tag field in the memory write request header.

Referring to FIG. 15, the memory write request header may include first through eighth bytes BYTE0~BYTE7, and 8-bit steering tag (ST) field may be assigned with the seventh byte BYTE6. The 8-bit ST field of '00000000' indicates that associated information is not included and when at least one of the 8-bit ST field corresponds to '1', the ST field may include various information.

Figure 16:
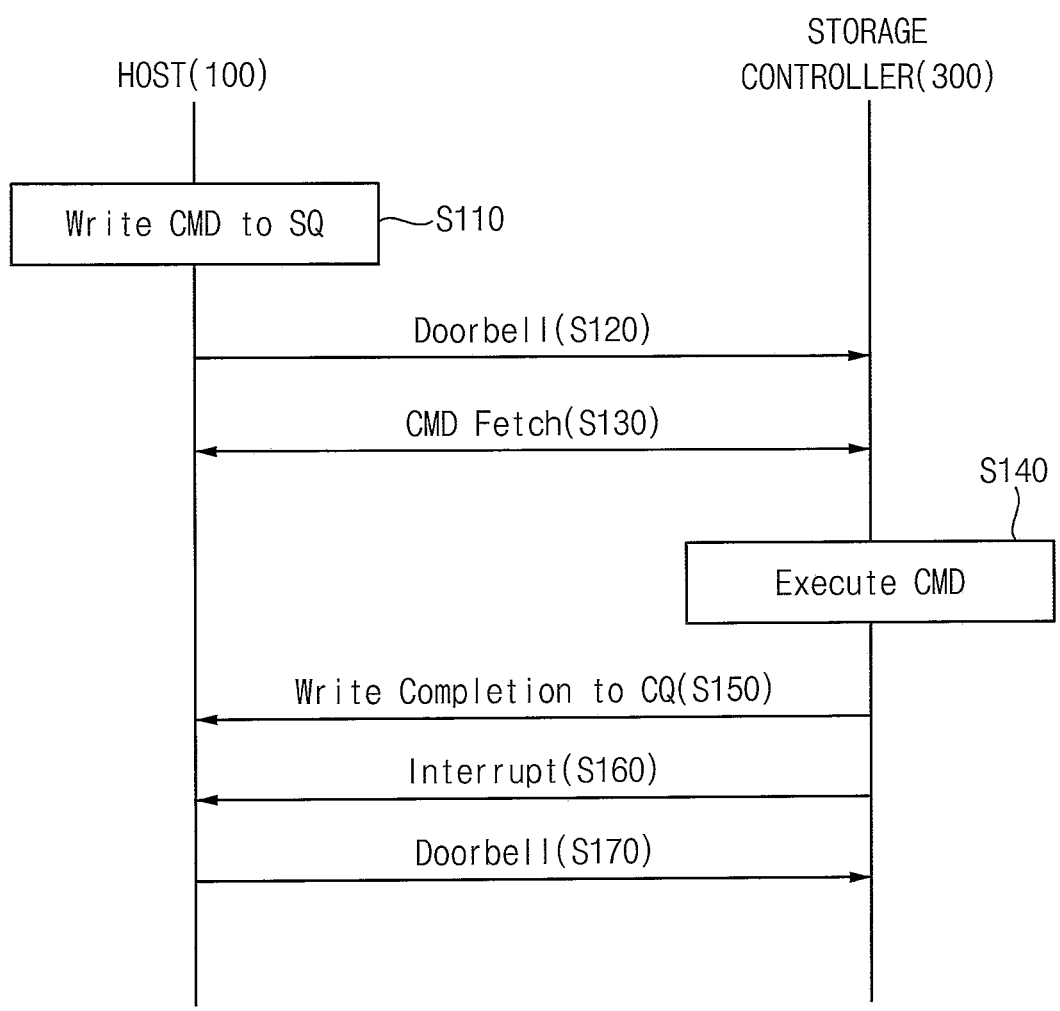
FIG. 16 is a flow diagram illustrating operation of the storage system of FIG. 1 according to embodiments of the inventive concept.

FIG. 16 is a flow diagram illustrating operation of the storage system of FIG. 1 according to embodiments of the inventive concept.

Referring to FIGS. 1, 2, 3, 4 and 16, the host 100 may write a command CMD to the submission queue 131 (S110). For example, the host 100 may write, to the submission queue 131, a write command for storing data to the storage device 200, a read command for reading data from the storage device 200, or various commands for controlling the storage device 200, such as a flush command, an erase command, etc. The command CMD stored in the submission queue 131 may be defined by the NVMe specification.

The host 100 may provide a doorbell to the storage controller 300 (S120). For example, the host 100 may notify the storage controller 300 that a new command CMD is written to the submission queue 131, by setting a new value to a door bell register included in the control register block 341 through the signaling manner.

The storage controller 300 may fetch the command CMD written to the submission queue 131 (S130). For example, the storage controller 300 may recognize that the new command CMD is stored in the submission queue 131, in response to the doorbell. In response to the recognized result, the command fetch block 351 in the storage controller 300 may fetch the command CMD written to the submission queue 131.

The storage controller 300 may perform an operation corresponding to the fetched command CMD (S140). For example, when the fetched command CMD is a write command, the storage controller 300 may receive write data from the host 100 and may store the received write data in the NVM 400. Alternately, when the fetched command CMD is a read command, the storage controller 300 may transmit read data from the NVM 400 to the host 100.

Once the operation corresponding to the fetched command CMD is completed, the storage controller 300 may write completion information to the completion queue 133 (S150). For example, the completion block 350 may write the completion information indicating that the operation associated with the fetched command CMD is completed, to the completion queue 133 of the host 100.

The storage controller 300 may transmit an interrupt signal to the host 100 (S160). For example, the interrupt generator 365 of the storage controller 300 may transmit, to the host 100, the interrupt signal for providing notification that the completion information is written to the completion queue 133.

The host 100 may provide the storage controller 300 with a doorbell providing notification that the completion information written to the completion queue 133 has been checked (S170).

Figure 17A:
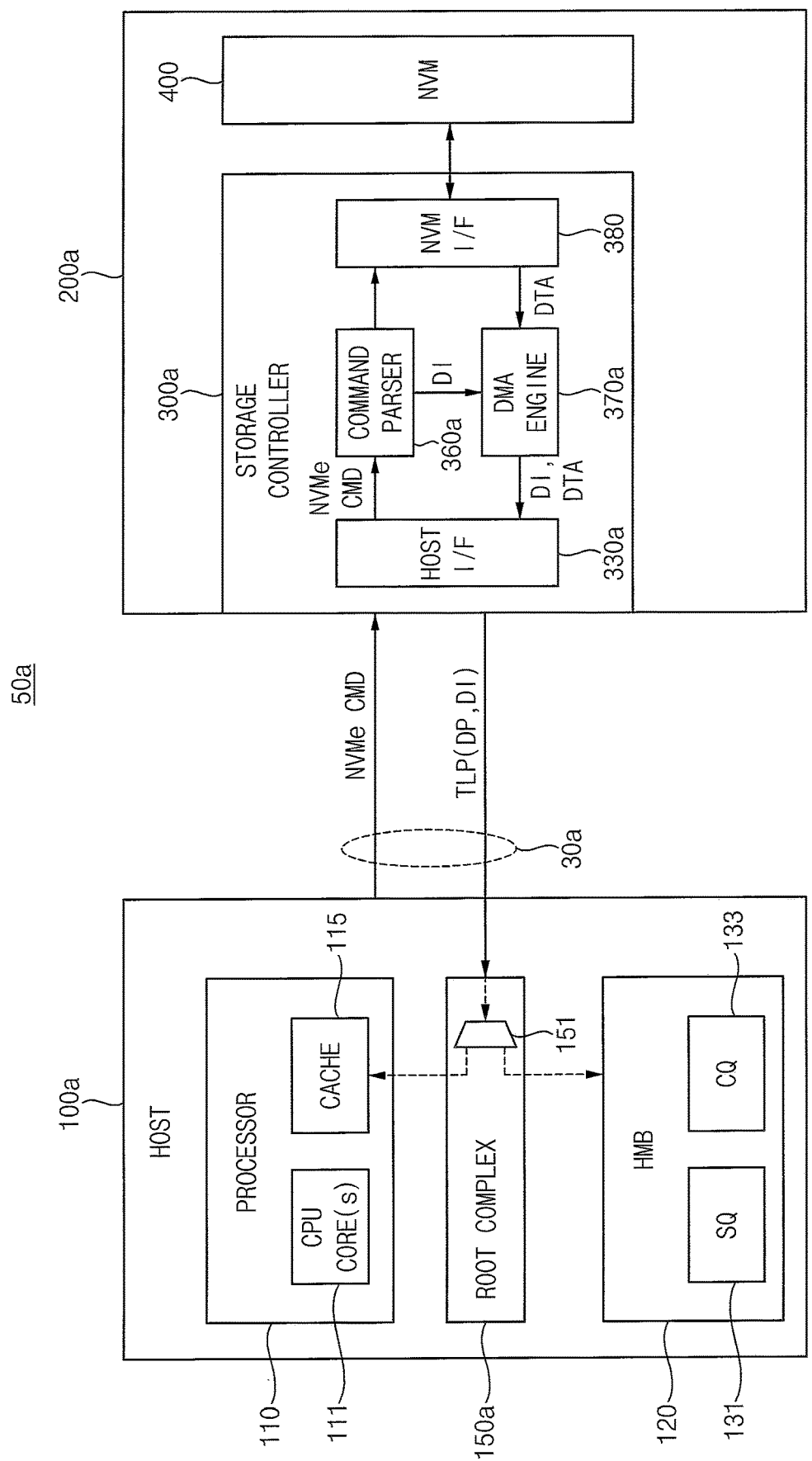
FIG. 17A is a block diagram illustrating a storage system according to embodiments of the inventive concept.

FIG. 17A is a block diagram illustrating a storage system 50a according to embodiments of the inventive concept.

Referring to FIG. 17A, the storage system 50a may include a host 100a and a storage device 200a connected through a link 30a.

The host 100a may include a processor 110, an HMB 120 and a root complex 150a.

The processor 110 may be referred to as a host processor and may include a CPU core(s) 111 and a cache 115 dedicated to the CPU core 111.

The HMB 120 may include a submission queue 121 and a completion queue 123. The root complex 150a may be connected to the processor 110 and the HMB 120. The root complex 150a may include a multiplexer 151.

The storage device 200a may include a storage controller 300a and at least one NVM 400.

The storage controller 300a may include a host interface (I/F) 330a, a command parser 360a, a DMA engine 370a and an NVM interface (I/F) 380.

The host interface 330a may be connected to a physical layer of the host 100a and may provide the command parser 360a with an NVMe command NVMe CMD fetched from the host 100a.

The command parser 360a may generate destination information DI associated with a destination of data requested by the NVMe command NVMe CMD by parsing the NVMe command NVMe CMD, may provide the NVMe command NVMe CMD to the NVM 400 through the NVM interface 380 and may provide the destination information DI to the DMA engine 370a. The NVMe command NVMe CMD may be an NVMe command associated with updating data stored in the cache 115 or storing new data in the cache 115 or in the HMB 120 such as NVMe read command or NVMe cache read command.

The NVM 400 may read data based on the NVMe command NVMe CMD and may provide the read data to the NVM interface 380 and the NVM interface 380 may provide a read data DTA to the DMA engine 370a.

The DMA engine 370a may provide the host interface 330a with the read data DTA and the destination information DI associated with the read data DTA and the host interface 330a may generate a TLP based on the read data DTA and the destination information DI and provide the root complex 150a with the TLP including the read data DTA and the destination information DI. The multiplexer 151 in the root complex 150a may directly provide the read data DTA to the cache 115 or provide the read data DTA to the HMB 120 based on the destination information DI.

The TLP may include the read data DTA and the destination information DI, the host interface 330a may indicate that the TLP includes the read data DTA by encoding the format Fmt field to '010'or '011' as described with reference to FIG. 12 and may represent the destination information DI by using the PH field described in relation to FIGS. 10, 11 and/or 15.

For example, when the host interface 330a encodes the destination information DI to designate the cache 115, the multiplexer 151 directly provides the read data DTA to the cache 115.

For example, when the host interface 330a encodes the destination information DI to designate the HMB 120, the multiplexer 151 provides the read data DTA to the HMB 120.

Figures 17B, 17C:
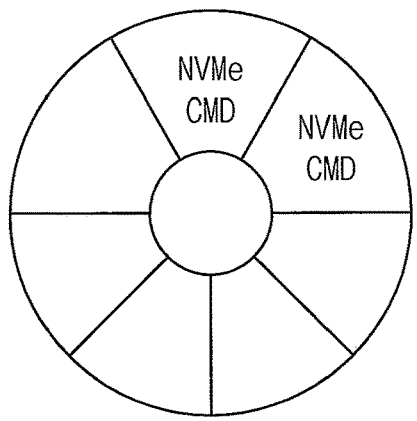
FIG. 17B is a conceptual diagram illustrating in one example the submission queue 131 of FIG. 17A.
FIG. 17C is a table listing examples of the NVMe command stored in the submission queue of FIG. 17B.

FIG. 17B is a conceptual diagram illustrating in one example the submission queue 131 of FIG. 17A, and FIG. 17C is a table listing examples of NVMe commands that may be stored in the submission queue 131 of FIG. 17B.

Referring to FIG. 17C, it is assumed that the NVMe command NVMe CMD is an NVMe read command.

Referring to FIG. 17B, the submission queue 131 may include a plurality of NVMe commands NVMe CMDs.

Referring to FIG. 17C, the NVMe read command may include a plurality of command double words (Dwords) (CDW)s. In some embodiments, a CDW may include 32 bits.

A first command double word CDW0 may include CID field, PSDT field and FUSE field. The CID field may indicate a command identifier. The PSDT field may indicate PRP or SGL date transfer and may indicate whether to use of a physical region page PRP or a scatter gather list (SGL) in transmitting data associated with a command. The FUSE field may indicate a fuse option.

A second command double word CDW1 may include a name space identifier (NSID).

A third command double word CDW2 and a fourth command double word CDW3 may be reserved.

A fifth command double word CDW4 and a sixth command double word CDW5 may include metal data pointer (MPTR) field. The MPTR field may be valid when the command includes meta data not interleaved with a logical block address (LBA).

Seventh through tenth command double words CWD6 to CWD9 may include data pointer (DPTR) field that specifies data used in the command.

An eleventh command double word CDW10 and a twelfth command double word CDW11 may include starting LBA (SLBA) field that specifies 64-bit LBA of a first logical block.

A thirteenth command double word CDW12 may include limit retry (LR) field, force unit access (FUA) field, protection information (PRINFO) field and number of logical blocks (NLB) field. The LR field may set limited number of retry and the FUA field may set storing data and meta data in nonvolatile media and reading data and meta data from nonvolatile media. The PRINFO field may set protection operation of information and the NLB field may indicate a number of logical blocks to be read.

Bits [08:31] of a fourteenth command double word CDW13 may be in reserved states and bits [00:07] of the fourteenth command double word CDW13 may include dataset management (DSM) field. The DSM field may indicate attributes of a logical block to be read. The processor 110 of FIG. 17A may include the destination information of the data to be updated or the new data in the NVMe read command by setting values of the PH and the ST in the bits [08:31] of the fourteenth command double word CDW13 when data stored in the cache 115 is to be updated or the new data is to be stored in the cache 115 or in the HMB 120 and may write the NVMe read command in the submission queue 131.

A fifteenth command double word CDW14 may include expected initial logical block reference tag (EILBRT) field and the EILBRT field may indicate expected value of an initial logical block.

A sixteenth command double word CDW15 may include expected logical block application tag mask (ELBATM) field and the ELBATM field may indicate expected value of an application tag mask.

That is, processor 110 of FIG. 17A may set the destination information of the data to be updated or the new data in reserved bits of at least one of a plurality of command double words of the NVMe command when data stored in the cache 115 is to be updated or the new data is to be stored in the cache 115 or in the HMB 120.

Figure 18:
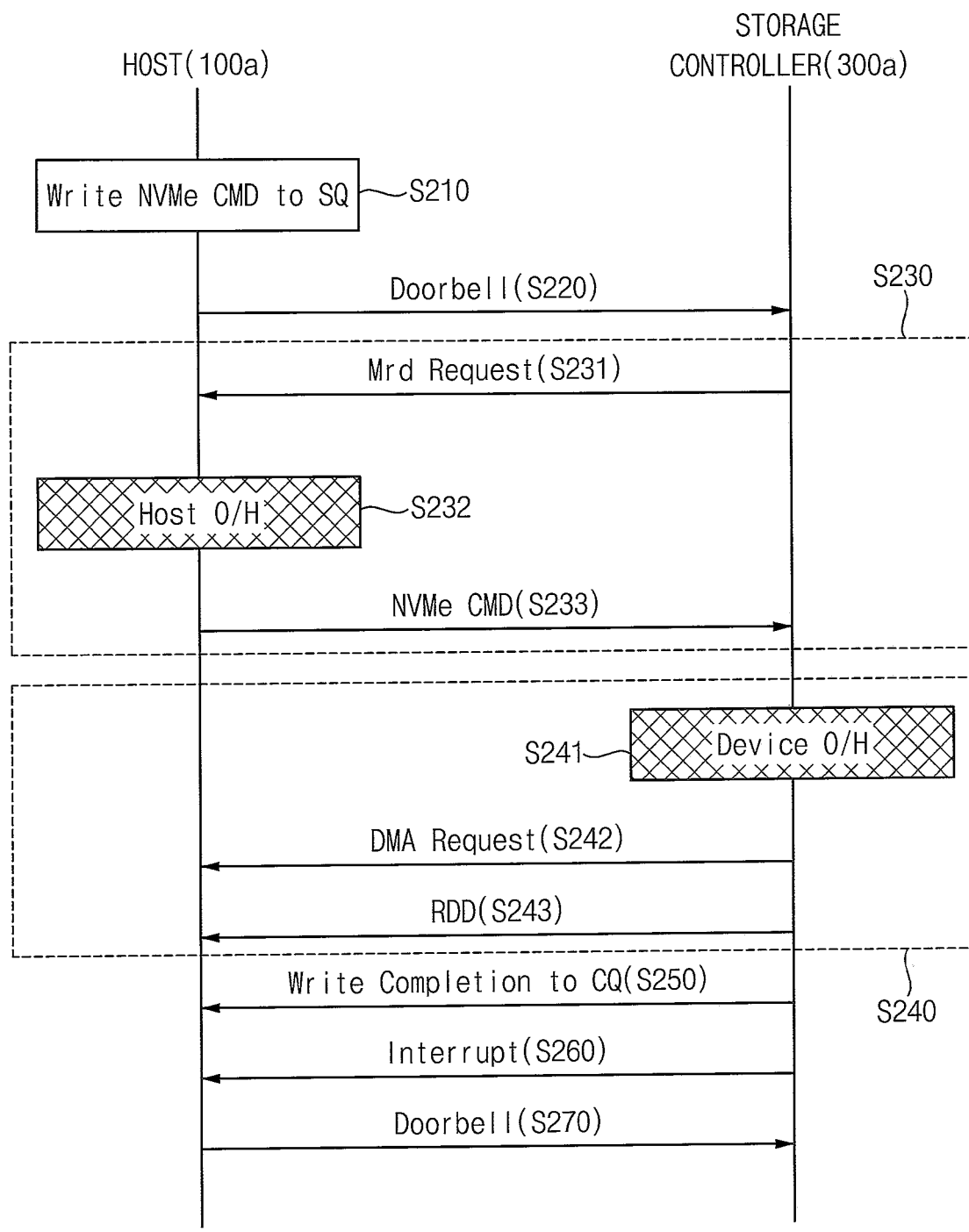
FIG. 18 is a flow diagram illustrating operation of the storage system of FIG. 17A according to embodiments of the inventive concept.

FIG. 18 is a flow diagram further illustrating operation of the storage system of FIG. 17A according to embodiments of the inventive concept. Here, a read operation performed by the storage system 50a will be described in relation to FIG. 18.

Referring to FIGS. 17A through 18, the host 100a may write an NVMe command NVMe CMD to the submission queue 131 (S210). For example, the NVMe command NVMe CMD may be an NVMe read command. As described above, when data stored in the cache 115 is to be updated or the new data is to be stored in the cache 115 or in the HMB 120, the host 100a may include the destination information of the data to be updated or the new data in the NVMe read command by setting values of the PH and the ST in the bits [08:31] of the fourteenth command double word CDW13 and may write the NVMe read command in the submission queue 131.

The host 100a may provide a doorbell to the storage controller 300a (S220). For example, the host 100a may notify the storage controller 300a that a new NVMe read command is written to the submission queue 131, by setting a new value to a door bell register included in the control register block 341 through the signaling manner.

The storage controller 300a may transmit a memory read Mrd request to the host 100a (S231). The memory read request may be a request for reading the NVMe read command NVMe CMD from the submission queue SQ included in the host memory buffer HMB of the host 100a.

The host 100a may be in an overhead (O/H) state (S232). For example, there may be required a predetermined time for the host 100a to process the received memory read request. Below, for convenience of description, the processing delay time of the host 100a is referred to as a "host overhead." That is, the host overhead state of the host 100a may indicate a state where the host 100a cannot respond to another operation or a specific operation during a predetermined time for the purpose of processing the specific operation. That is, the host 100a may perform the specific operation after the host overhead state.

The host 100a may transmit the NVMe read command NVMe CMD to the storage controller 300a after the host overhead (S233).

Here, method steps S231, S232 and S233 may be understood as sub-steps within a method step S230, wherein method step (S240) may include sub-seps S241, S242 and S243. Accordingly, after completion of S230, the storage controller 300a may perform an operation corresponding to the fetched NVMe read command NVMe CMD (S240).

That is, the storage controller 300a may be in a device overhead (O/H) state (S241). For example, the storage controller 300a may prepare relevant read data in response to the fetched NVMe read command NVMe CMD. A time to prepare the read data may act as the device overhead. In some embodiments, the preparing of data may indicate an operation of reading read data from the NVM 400 and storing the read data in the SRAM 315 or an operation of preparing data such that read data are transmitted to the host 100a.

After the device overhead, the storage controller 300a may transmit a DMA request to the host 100a (S242). The DMA request may be a request for a DMA operation of transmitting the read data to the host 100a. And the storage controller 300a may transmit read data RDD to the host 100a through the DMA operation (S243).

Thereafter, the storage controller 300a and the host 100a may perform method steps S250, S260 and S270, which are respectively analogous to method steps S150, S160 and S170 of FIG. 16.

Figure 19:
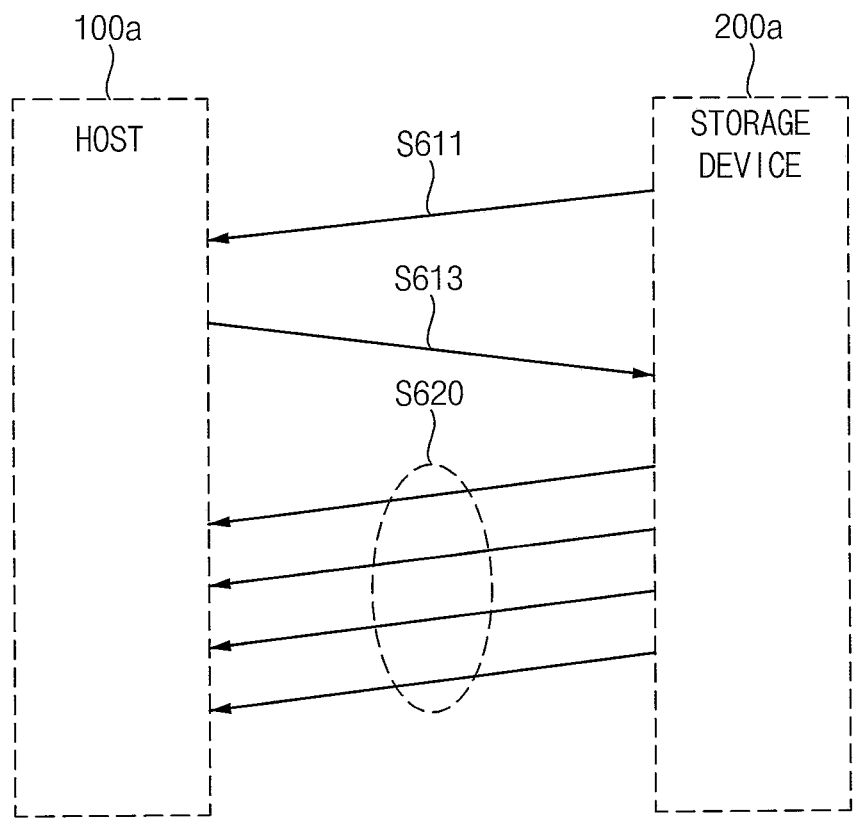
FIG. 19 is a conceptual diagram illustrating operation of the storage system of FIG. 17A according to embodiments of the inventive concept.

FIG. 19 is a conceptual diagram further illustrating operation of the storage system of FIG. 17A.

Referring to FIGS. 17A and 19, the storage device 200a may transmit a memory read request to the host 100a in response to a previously communicated doorbell (S611). The host 100a may then fetch and communicate a command corresponding to the read request to the storage system 200a (S613). And upon receipt of the command corresponding to the read command, the storage system 200a may directly communicate read data to the cache 115 of the host 110a (S620).

Figure 20:
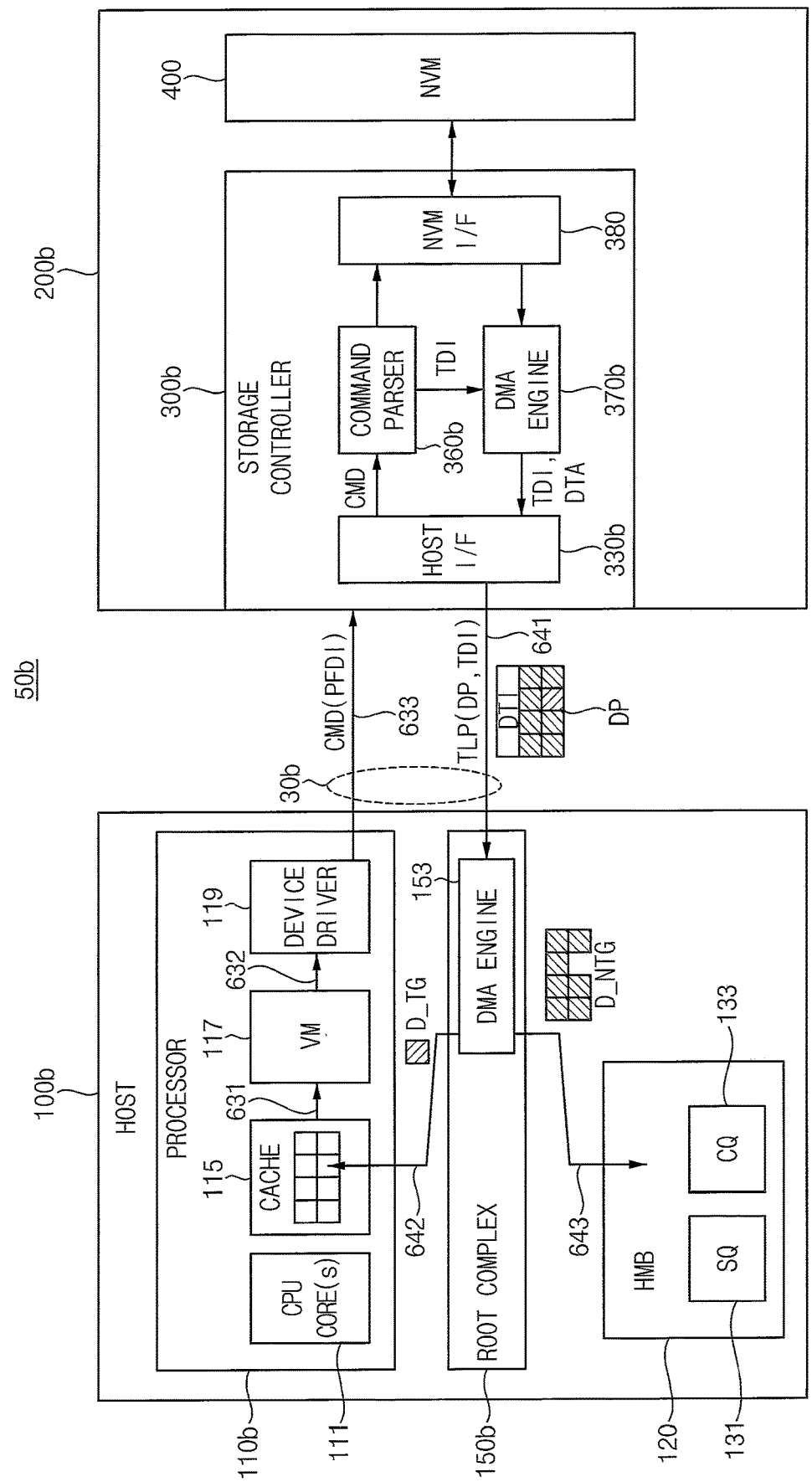
FIG. 20 is a block diagram illustrating a storage system according to embodiments of the inventive concept.

FIG. 20 is a block diagram illustrating a storage system 50b according to embodiments of the inventive concept.

Referring to FIG. 20, the storage system 50b may generally include a host 100b and a storage device 200b connected through a link 30b.

The host 100b may include a processor 110b, an HMB 120 and a root complex 150b.

The processor 110b may be referred to as a "host processor" and may include one or more CPU core(s) 111. The processor 110b may also include a cache 115 dedicated to the use of the CPU core(s) 111. Still further, the processor 110b may include a volume manager VM 117 and a device driver 119.

Here, the cache 115 may be swapped based on a unit of a cache line.

The HMB 120 may include a submission queue 121 and a completion queue 123. The root complex 150b may be connected to the processor 110b and the HMB 120. The root complex 150b may include a second DMA engine 153.

When a cache miss that a data requested by the CPU core 111 does not exist in the cache 115 occurs, the CPU core 111 notifies the volume manager 117 of an occurrence of the cache miss as a reference numeral 631 indicates, the volume manager 117 notifies the device driver 119 of a page fault as a reference numeral 632 indicates and the device driver 119 provides the storage controller 300b with a command CMD including page fault data information (PFDI) associated with generating the page fault through the link 30b as a reference numeral 633 indicates. The command CMD may be a read command requesting partial updating of the cache 115.

The storage device 200b may include a storage controller 300b and the NVM 400.

The storage controller 300b may include a host interface (I/F) 330b, a command parser 360b, a first DMA engine 370b and an NVM interface (I/F) 380.

The host interface 330b may be connected to a physical layer of the host 100b and may provide the command parser 360b with the command CMD fetched from the host 100b.

The command parser 360a may generate target data information TDI associated with data to be partially updated by parsing the command CMD and the page fault data information PFDI, may provide the command CMD to the NVM 400 through the NVM interface 380 and may provide the target data information TDI I to the first DMA engine 370b, in response to the command CMD corresponding to a read command.

The NVM 400 may read data based on the command CMD and may provide the read data to the NVM interface 380 and the NVM interface 380 may provide a read data to the first DMA engine 370b.

The first DMA engine 370b may provide the host interface 330b with the read data DTA and the target data information TDI associated with the read data DTA and the host interface 330b may generate a TLP based on the read data DTA and the target data information TDI and provide the root complex 150b as a reference numeral 641 indicates.

The TLP may include the target data information TDI and a data payload DO corresponding to the read data DTA. The second DMA engine 153 of the root complex 150b, based on the target data information TD, may provide the cache 115 with a target data D_TG of the read data DTA as a reference numeral 642 indicates and may provide the HMB 120 with a non-target data D_NTG of the read data DTA except for the target data D_TG as a reference numeral 643 indicates.

The host interface 330b may indicate that the TLP includes the read data DTA by encoding the format Fmt field to '010'or '011' as described with reference to FIG. 12 and may represent the target destination information TDI by using the PH field as described with reference to FIG. 11 or FIG. 15.

In some embodiments wherein the cache 115 includes a plurality of cache lines, the host interface 330b may represent bitmap information corresponding to respective one of the plurality of cache lines by using the ST field.

Figure 21:
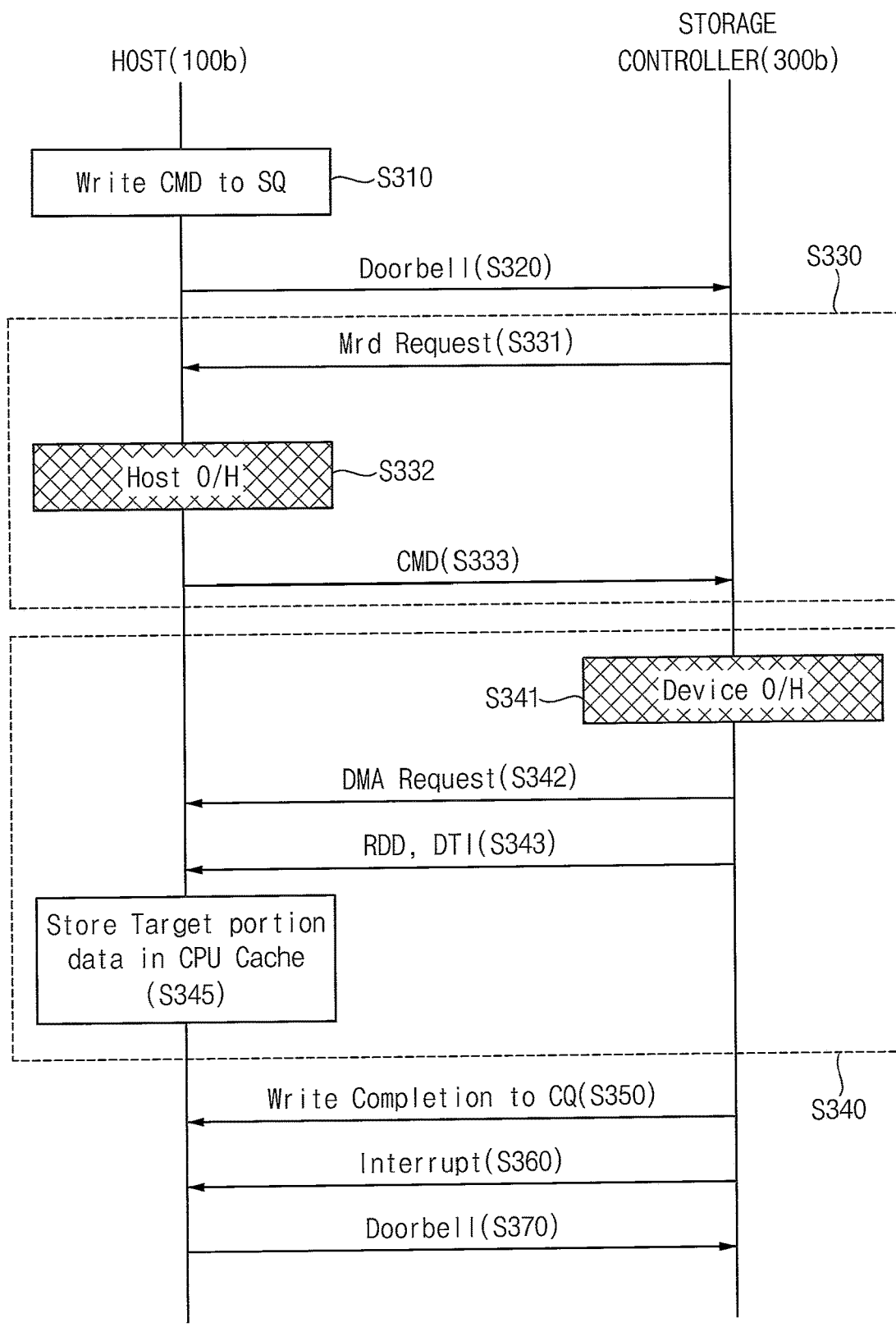
FIG. 21 is a flow diagram illustrating operation of the storage system of FIG. 20 according to embodiments of the inventive concept.

FIG. 21 is a flow diagram illustrating operation of the storage system of FIG. 20 according to embodiments of the inventive concept. Here, performing of a read operation by the storage system 50b will be described with reference to FIG. 21.

Referring to FIGS. 20 and 21 and comparing FIGS. 16 and 18, method steps S310 and operation S320 are substantially similar to methods steps S110 and S120. Further, method step S330, including sub-steps S331, S322 and S333, is substantially similar to method step S230, including sub-steps S231, S232 and S233 of FIG. 18.

Additionally, the storage controller 300b may perform an operation corresponding to the fetched command CMD (S340), including sub-steps S341, S342, S343 and S345.

That is, the storage controller 300b may be in a device overhead (O/H) state (S341). For example, the storage controller 300b may prepare relevant read data in response to the fetched read command CMD. A time to prepare the read data may act as the device overhead. In some embodiments, the preparing of data may indicate an operation of reading read data from the NVM 400 and storing the read data in the SRAM 315 or an operation of preparing data such that read data are transmitted to the host 100b.

After the device overhead, the storage controller 300b may transmit a DMA request to the host 100b (S342). The DMA request may be a request for a DMA operation of transmitting the read data to the host 100b. The storage controller 300a may transmit read data RDD and the target data information TDI to the host 100b through the DMA operation (S343). And, the second DMA engine 153 may store the target data in the cache 115 and may store the non-target data in the HMB 120 based on the target data information TDI (S345).

Thereafter, the storage controller 300b and the host 100b may perform method steps S350, S360 and S370 which are respectively and substantially similar to method steps S150, S160 and S170 of FIG. 16.

FIG. 22 is a conceptual diagram illustrating target data information included in the TLP of FIG. 20.

Referring to FIG. 22, it is assumed that the cache 115 includes first through eighth cache lines, the data DTA includes first through eighth cache line data CLD1, CLD2, CLD3, CLD4, CLD5, CLD6, CLD7 and CLD8 corresponding to respective one of the first through eighth cache lines and a cache miss occurs in the seventh cache line.

Due to the cache miss in the seventh cache line, bitmap BM information of the seventh cache line data CLD7 may have a logic level indicating that the seventh cache line data CLD7 corresponds to the target data and the bitmap BM information of each of remaining cache line data CLD1, CLD2, CLD3, CLD4, CLD5, CLD6 and CLD8 may have a logic level indicating that each of the cache line data CLD1, CLD2, CLD3, CLD4, CLD5, CLD6 and CLD8 corresponds to the non-target data. The host interface 330b may represent the bitmap BM information by using the PH field as described with reference to FIG. 11 or FIG. 15.

As described in relation to FIGS. 20, 21 and 22, when data stored in the cache 115 is to be updated by unit of a cache line, the host 100b may increase a cache hit rate in order to enhance performance of the storage system 50b.

Figure 23:
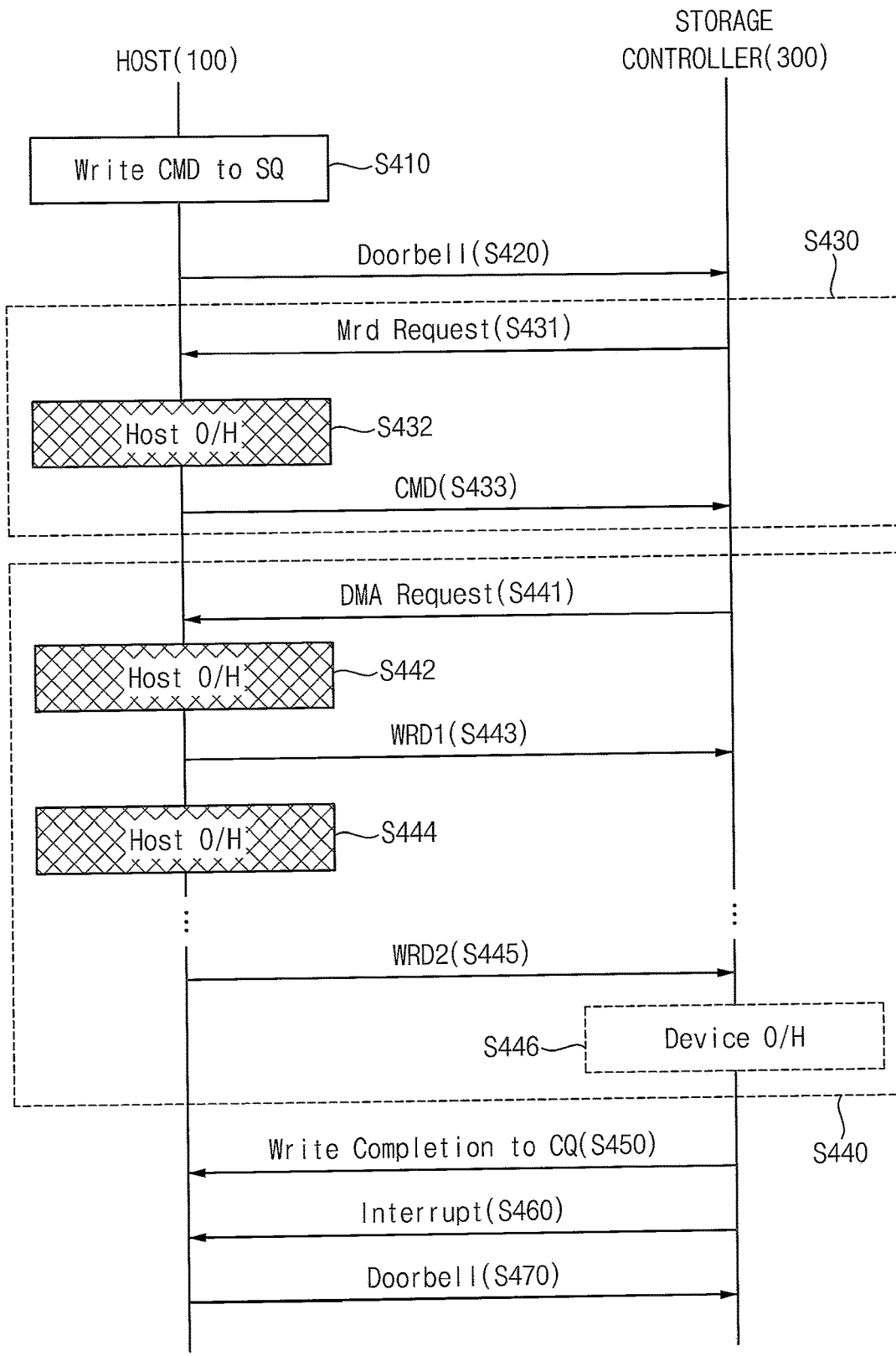
FIG. 23 is a flow diagram illustrating operation of the storage system of FIG. 1 according to embodiments of the inventive concept.

FIG. 23 is a flow diagram further illustrating operation of the storage system of FIG. 1 according to embodiments of the inventive concept. Here, it is assumed that a write operation is performed by the storage system 50 of FIG. 1.

Referring to FIGS. 1 and 23, the host 100 may perform method steps S410 and operation S420 which are respectively similar to operation S110 and operation S120 of FIG. 16.

Thereafter, the storage controller 300 and host 100 may perform method step S430, including sub-steps S431, S432 and S433, so that the storage controller 300 may fetch the command CMD stored in the submission queue 131.

That is, the storage controller 300 may transmit a memory read Mrd request to the host 100 (S341). The memory read request may be a request for reading the command CMD from the submission queue 131 included in the HMB 120 of the host 100.

In response to the memory read Mrd request, the host 100 may be placed in an overhead (O/H) state (S432). For example, a predetermined time may be required for the host 100 to process the received memory read Mrd request. However, ultimately, the host 100 may transmit the command CMD to the storage controller 300 (S433).

Upon completion of the method step S340, the storage controller 300 may perform an operation corresponding to the fetched command CMD (S440), including sub-steps S441, S442, S443, S444, S445 and S446. Here, it is assumed that the fetched command CMD is a write command.

That is, the storage controller 300 may transmit a DMA request to the host 100 (S441). The DMA request may be a DMA request associated with write data stored in the HMB 120 of the host 120.

As a result, the host 100 may be placed in the overhead (O/H) state (S442). That is, the host 100 may prepare a DMA operation associated with first write data WRD1 during a predetermined time.

Once the host overhead is complete, the host 100 may transmit the first write data WRD1 to the storage controller 300 (S443). That is, the host 100 and the storage controller 300 may perform the DMA operation associated with the first write data WRD1.

The host 100 may again be placed in the overhead (O/H) state (S444). That is, the host 100 may prepare a DMA operation associated with second write data WRD2 during a predetermined time.

After the host overhead, the host 100 may transmit the second write data WRD2 to the storage controller 300 (S445). That is, the host 100 and the storage controller 300 may perform the DMA operation associated with the second write data WRD2. In some embodiments, the storage controller 300 and the host 100 may perform the DMA operation associated with multiple write data by repeatedly performing method steps S442 through S445.

The storage controller 300 may then program the write data, on which the DMA operation has been completed, in the NVM 400 (S446). In some embodiments, a program operation associated with the NVM 400 may be a device overhead or a device overhead state. The device overhead may indicate a delay due to an operation performed within the storage device 200. In some embodiments assuming a general write command, method step S446 may be omitted.

Thereafter, the host 100 and the storage controller 300 may perform method steps S450, S460 and S470 which are respectively analogous to method steps S150, S160 and S170 of FIG. 16.

Figure 24:
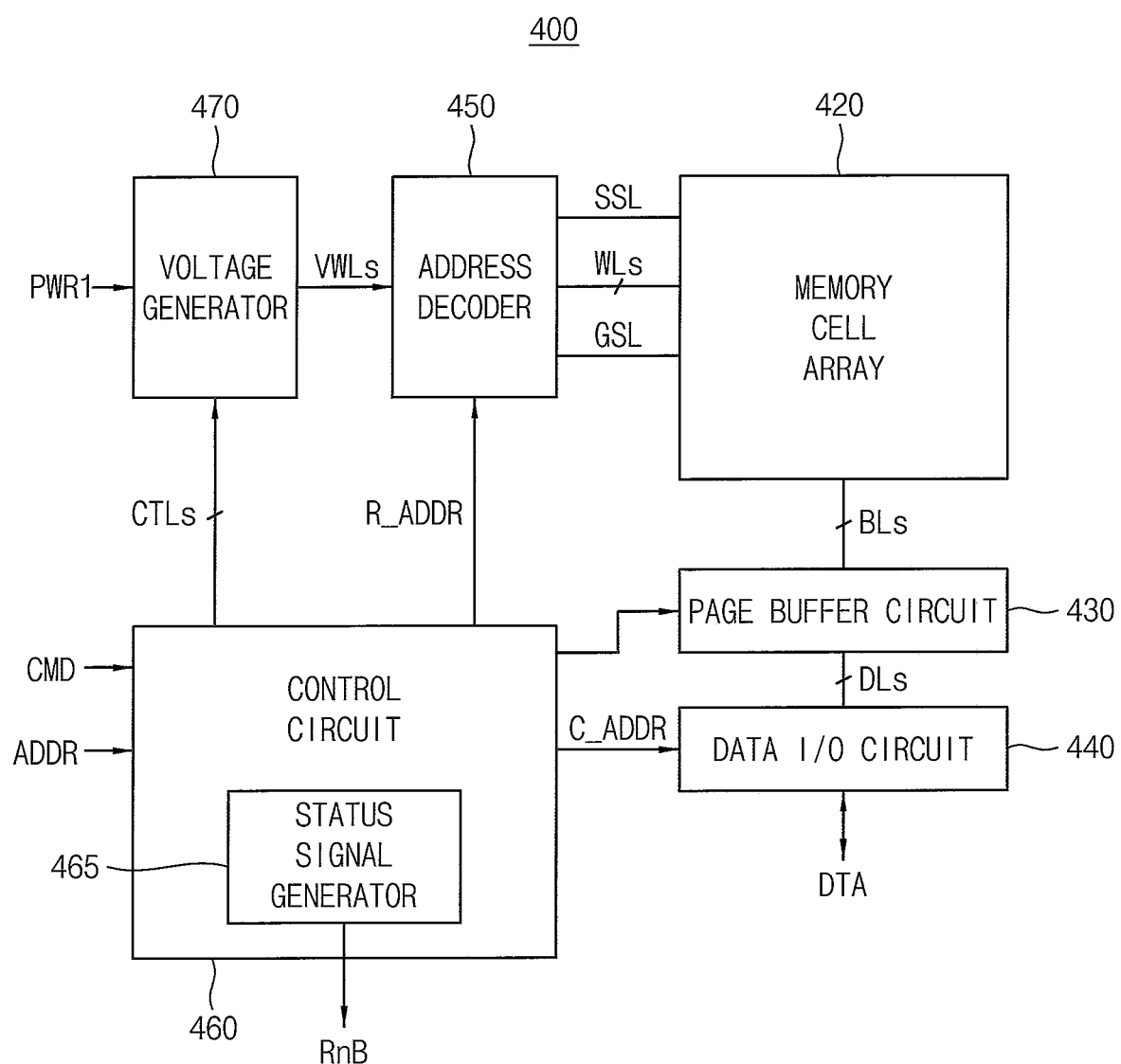
FIG. 24 is a block diagram further illustrating in one example the nonvolatile memory device in FIG. 1 according to embodiments of the inventive concept.

FIG. 24 is a block diagram illustrating in one example of the NVM 400 of FIG. 1 according to embodiments of the inventive concept.

Referring to FIG. 24, the NVM 400 may include a memory cell array 420, an address decoder 450, a page buffer circuit 430, a data input/output (I/O) circuit 440, a control circuit 460, and a voltage generator 470.

The memory cell array 420 may be coupled to the address decoder 450 through a string selection line SSL, a plurality of word-lines WLs, and a ground selection line GSL. In addition, the memory cell array 420 may be coupled to the page buffer circuit 430 through a plurality of bit-lines BLs.

The memory cell array 420 may include a plurality of memory cells coupled to the plurality of word-lines WLs and the plurality of bit-lines BLs.

In some example embodiments, the memory cell array 420 may be or include a three-dimensional memory cell array, which is formed on a substrate in a three-dimensional structure (e.g., a vertical structure). In this case, the memory cell array 420 may include vertical cell strings that are vertically oriented such that at least one memory cell is located over another memory cell.

Figure 25:
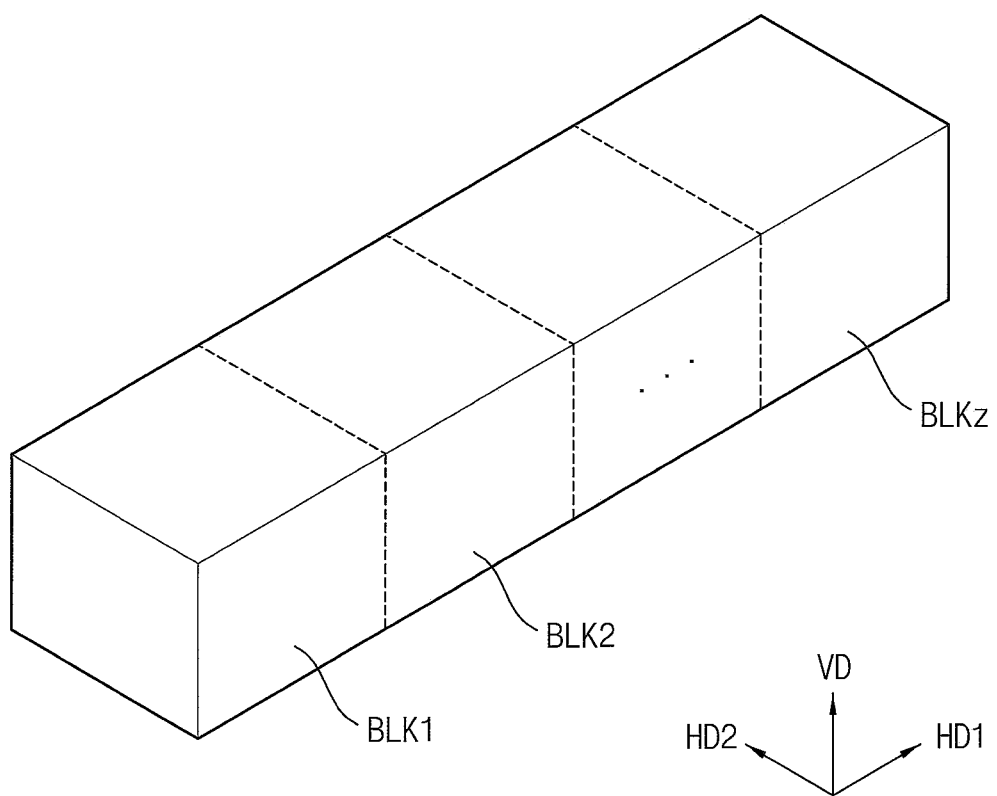
FIG. 25 is a perspective diagram illustrating the memory cell array in the nonvolatile memory device of FIG. 24.

FIG. 25 is a conceptual diagram further illustrating in one example the memory cell array 420 of FIG. 24.

Referring to FIG. 25, the memory cell array 420 may include a plurality of memory blocks BLK1 to BLKz. Here, z may be an integer greater than two. The memory blocks BLK1 to BLKz extend along a first horizontal direction HD1, a second horizontal direction HD2 and a vertical direction VD. In some example embodiments, the memory blocks BLK1 to BLKz are selected by the address decoder 450 in FIG. 24. For example, the address decoder 450 may select a memory block BLK corresponding to a block address among the memory blocks BLK1 to BLKz.

Figure 26:
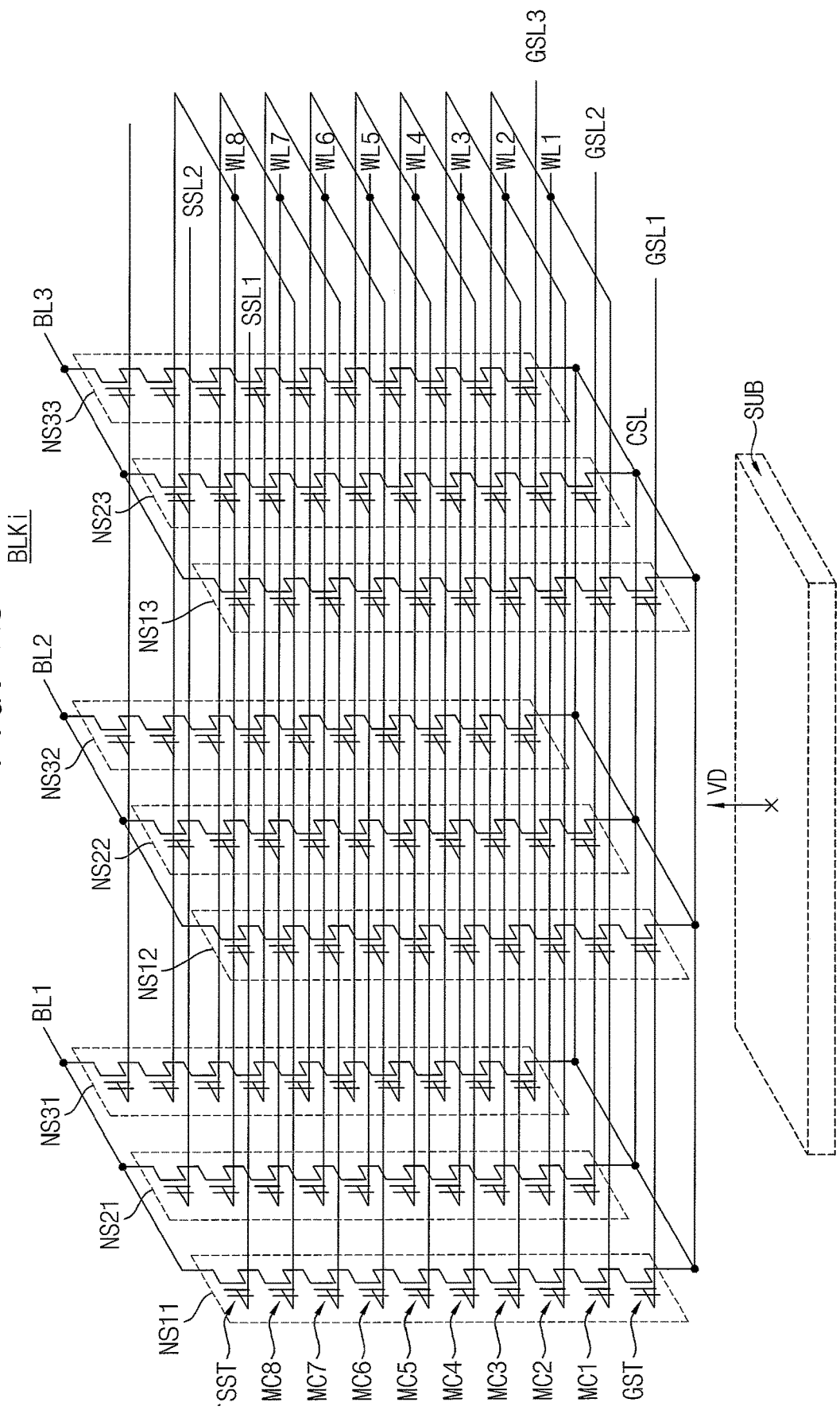
FIG. 26 is a partial circuit diagram illustrating a memory blocks of FIG. 25.

FIG. 26 is a partial circuit diagram further illustrating one of the memory blocks (e.g., BLKi) of FIG. 25.

The memory block BLKi of FIG. 26 may be formed on a substrate SUB in a three-dimensional structure (or a vertical structure). For example, a plurality of memory cell strings included in the memory block BLKi may be formed in the direction VD perpendicular to the substrate SUB.

Referring to FIG. 26, the memory block BLKi may include memory cell strings NS11 to NS33 coupled between bit-lines BL1, BL2 and BL3 and a common source line CSL. Each of the memory cell strings NS11 to NS33 may include a string selection transistor SST, a plurality of memory cells MC1 to MC8, and a ground selection transistor GST. In FIG. 26, each of the memory cell strings NS11 to NS33 is illustrated to include eight memory cells MC1 to MC8. However, inventive concepts are not limited thereto. In some example embodiments, each of the memory cell strings NS11 to NS33 may include any number of memory cells.

The string selection transistor SST may be connected to corresponding string selection lines SSL1 to SSL3. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL.

Word-lines (e.g., WL1) having the same height may be commonly connected, and the ground selection lines GSL1 to GSL3 and the string selection lines SSL1 to SSL3 may be separated. In FIG. 26, the memory block BLKi is illustrated to be coupled to eight word-lines WL1 to WL8 and three bit-lines BL1 to BL3. However, inventive concepts are not limited thereto. In some example embodiments, the memory cell array 420 may be coupled to any number of word-lines and bit-lines.

Figure 27:
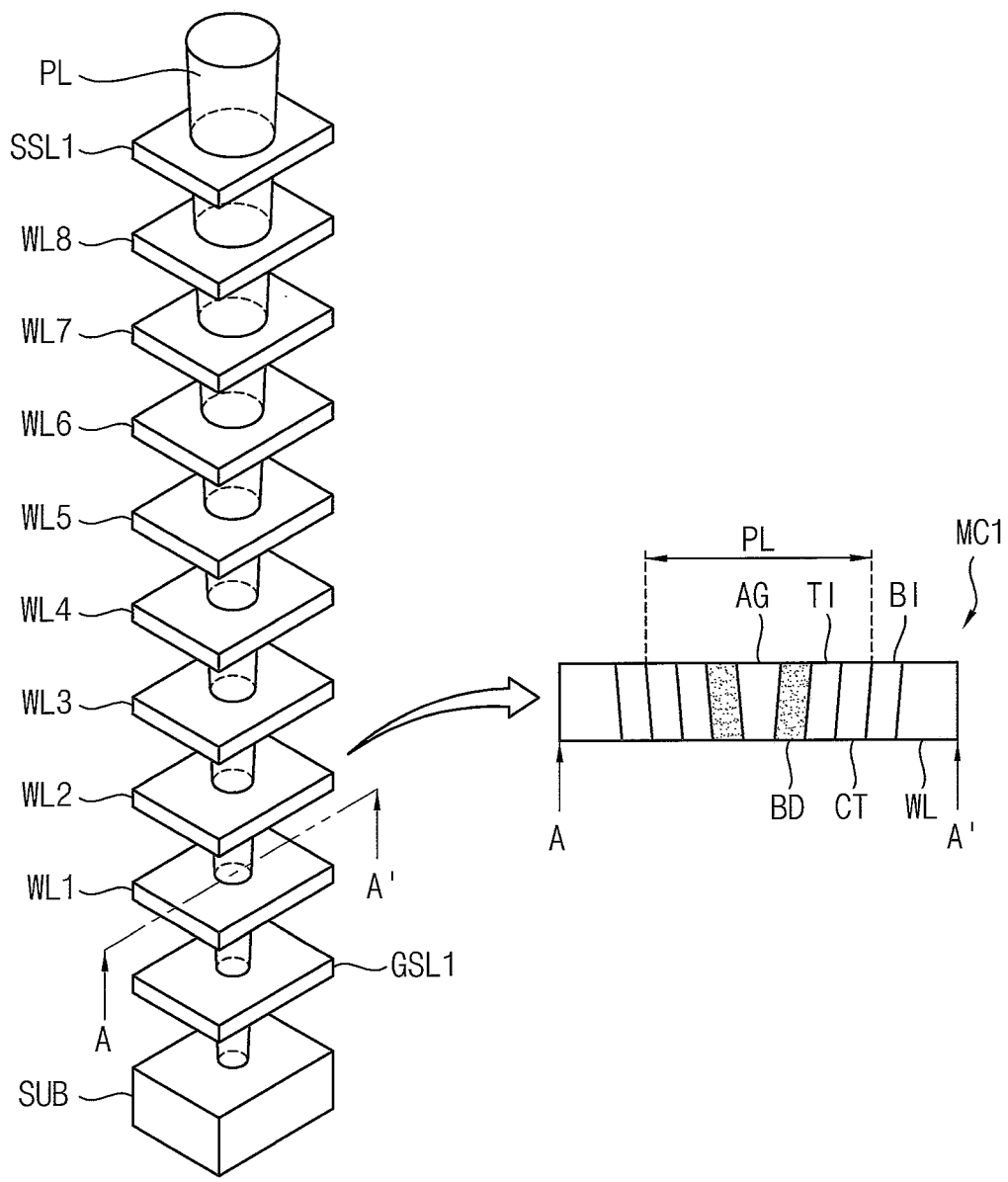
FIG. 27 is a partial perspective diagram illustrating one possible structure for a cell string in the memory block of FIG. 26.

FIG. 27 is a partial, perspective diagram illustrating one example of a cell string structure CS in a memory block of FIG. 26.

Referring to FIGS. 26 and 27, a pillar PL is provided on the substrate SUB such that the pillar PL extends in a direction perpendicular to the substrate SUB to make contact with the substrate SUB. Each of the ground selection line GSL, the word lines WL1 to WL8, and the string selection lines SSL illustrated in FIG. 26 may be formed of a conductive material parallel with the substrate SUB, for example, a metallic material. The pillar PL may be in contact with the substrate SUB through the conductive materials forming the string selection lines SSL, the word lines WL1 to WL8, and the ground selection line GSL.

A cut-away sectional view taken along a line A-A' is also included in FIG. 27. In some example embodiments, a sectional view of a first memory cell MC1 corresponding to a first word line WL1 is illustrated. The pillar PL may include a cylindrical body BD. An air gap AG may be defined in the interior of the body BD.

The body BD may include P-type silicon and may be an area where a channel will be formed. The pillar PL may further include a cylindrical tunnel insulating layer TI surrounding the body BD and a cylindrical charge trap layer CT surrounding the tunnel insulating layer TI. A blocking insulating layer BI may be provided between the first word line WL and the pillar PL. The body BD, the tunnel insulating layer TI, the charge trap layer CT, the blocking insulating layer BI, and the first word line WL may constitute or be included in a charge trap type transistor that is formed in a direction perpendicular to the substrate SUB or to an upper surface of the substrate SUB. A string selection transistor SST, a ground selection transistor GST, and other memory cells may have the same structure as the first memory cell MC1.

Referring to FIG. 24, the control circuit 460 may receive the command (signal) CMD and the address (signal) ADDR from the storage controller 300, and may control an erase loop, a program loop and/or a read operation of the NVM 400 based on the command signal CMD and the address signal ADDR. The program loop may include a program operation and a program verification operation. The erase loop may include an erase operation and an erase verification operation.

For example, the control circuit 460 may generate control signals CTLs, which are used for controlling the voltage generator 470, based on the command signal CMD, and generate a row address R_ADDR and a column address C_ADDR based on the address signal ADDR. The control circuit 460 may provide the row address R_ADDR to the address decoder 450 and may provide the column address C_ADDR to the data I/O circuit 440.

The address decoder 450 may be coupled to the memory cell array 420 through the string selection line SSL, the plurality of word-lines WLs, and the ground selection line GSL. During the program operation or the read operation, the address decoder 450 may determine one of the plurality of word-lines WLs as a first word-line (e.g., a selected word-line) and determine rest of the plurality of word-lines WLs except for the first word-line as unselected word-lines based on the row address R_ADDR.

The voltage generator 470 may generate word-line voltages VWLs, which are required for the operation of the NVM 400, based on the control signals CTLs. The voltage generator 470 may receive a power PWR1 from the storage controller 300. The word-line voltages VWLs may be applied to the plurality of word-lines WLs through the address decoder 450.

For example, during the erase operation, the voltage generator 470 may apply an erase voltage to a well of the memory block and may apply a ground voltage to entire word-lines of the memory block. During the erase verification operation, the voltage generator 470 may apply an erase verification voltage to the entire word-lines of the memory block or sequentially apply the erase verification voltage to word-lines in a word-line basis.

For example, during the program operation, the voltage generator 470 may apply a program voltage to the first word-line and may apply a program pass voltage to the unselected word-lines. In addition, during the program verification operation, the voltage generator 470 may apply a program verification voltage to the first word-line and may apply a verification pass voltage to the unselected word-lines.

Furthermore, during the read operation, the voltage generator 470 may apply a read voltage to the first word-line and may apply a read pass voltage to the unselected word-lines.

The page buffer circuit 430 may be coupled to the memory cell array 420 through the plurality of bit-lines BLs. The page buffer circuit 430 may include a plurality of page buffers. In some example embodiments, one page buffer may be connected to one bit-line. In some example embodiments, one page buffer may be connected to two or more bit-lines.

The page buffer circuit 430 may temporarily store data to be programmed in a selected page or data read out from the selected page.

The data I/O circuit 440 may be coupled to the page buffer circuit 430 through data lines DLs. During the program operation, the data input/output circuit 440 may receive the data DTA from the storage controller 300 provide the data DTA to the page buffer circuit 430 based on the column address C_ADDR received from the control circuit 460.

During the read operation, the data I/O circuit 440 may provide the data DTA which are stored in the page buffer circuit 430, to the storage controller 300 based on the column address C_ADDR received from the control circuit 460.

The control circuit 460 may control the page buffer circuit 430 and data I/O circuit 440.

The control circuit 460 may include a status signal generator 465 and the status signal generator 465 may generate a status signal RnB indicating whether each of the program operation, the erase operation and the read operation is completed or and/or is in progress.

The storage controller 300 may determine idle state or busy state of the nonvolatile memory devices 400 based on the status signal RnB.

Figure 28:
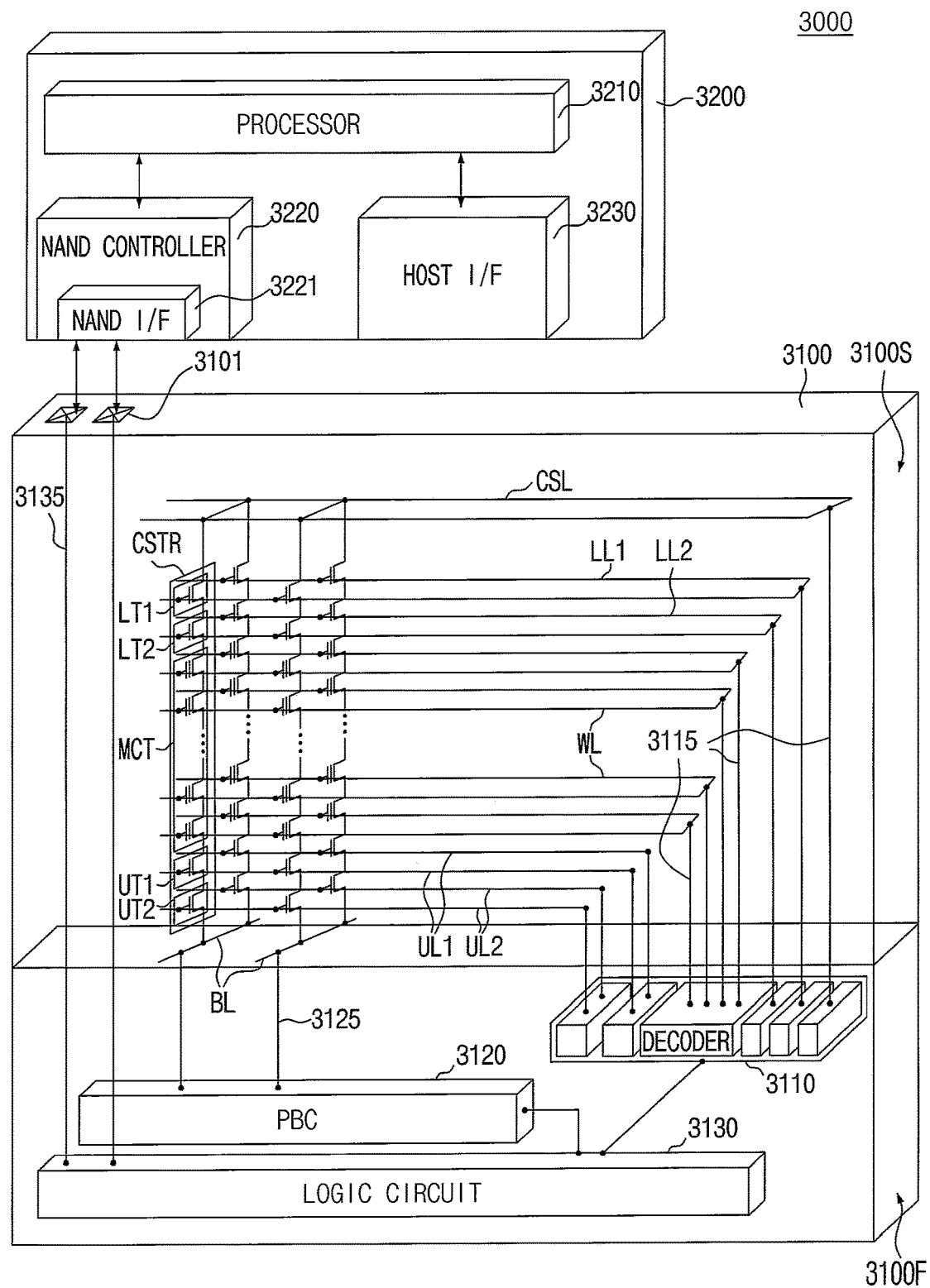
FIG. 28 is a block diagram illustrating an electronic system including a semiconductor device according to embodiments of the inventive concept.

FIG. 28 is a block diagram illustrating an electronic system 3000 including a storage system (e.g., a semiconductor device) according to embodiments of the inventive concept.

Referring to FIG. 28, the electronic system 3000 may include a semiconductor device 3100 electrically connected to a controller 3220. The electronic system 3000 may be a storage device including one or a plurality of semiconductor devices 3100 or an electronic device including a storage device. For example, the electronic system 3000 may be a solid state drive (SSD) device, a universal serial bus (USB), a computing system, a medical device, or a communication device that may include one or a plurality of semiconductor devices 3100.

The semiconductor device 3100 may be a nonvolatile memory device, for example, a nonvolatile memory device that will be illustrated with reference to FIGS. 24 through 27. The semiconductor device 3100 may include a first structure 3100F and a second structure 3100S on the first structure 3100E The first structure 3100F may be a peripheral circuit structure including a decoder circuit 3110, a page buffer circuit 3120, and a logic circuit 3130. The second structure 3100S may be a memory cell structure including a bit-line BL, a common source line CSL, word-lines WL, first and second upper gate lines UL1 and UL2, first and second lower gate lines LL1 and LL2, and memory cell strings CSTR between the bit line BL and the common source line CSL.

In the second structure 3100S, each of the memory cell strings CSTR may include lower transistors LT1 and LT2 adjacent to the common source line CSL, upper transistors UT1 and UT2 adjacent to the bit-line BL, and a plurality of memory cell transistors MCT between the lower transistors LT1 and LT2 and the upper transistors UT1 and UT2. The number of the lower transistors LT1 and LT2 and the number of the upper transistors UT1 and UT2 may be varied in accordance with example embodiments.

In some embodiments, the upper transistors UT1 and UT2 may include string selection transistors, and the lower transistors LT1 and LT2 may include ground selection transistors. The lower gate lines LL1 and LL2 may be gate electrodes of the lower transistors LT1 and LT2, respectively. The word lines WL may be gate electrodes of the memory cell transistors MCT, respectively, and the upper gate lines UL1 and UL2 may be gate electrodes of the upper transistors UT1 and UT2, respectively.

In some embodiments, the lower transistors LT1 and LT2 may include a lower erase control transistor LT1 and a ground selection transistor LT2 that may be connected with each other in serial. The upper transistors UT1 and UT2 may include a string selection transistor UT1 and an upper erase control transistor UT2. At least one of the lower erase control transistor LT1 and the upper erase control transistor UT2 may be used in an erase operation for erasing data stored in the memory cell transistors MCT through gate induced drain leakage (GIDL) phenomenon.

The common source line CSL, the first and second lower gate lines LL1 and LL2, the word lines WL, and the first and second upper gate lines UL1 and UL2 may be electrically connected to the decoder circuit 3110 through first connection wirings 1115 extending to the second structure 3110S in the first structure 3100F. The bit-lines BL may be electrically connected to the page buffer circuit 3120 through second connection wirings 3125 extending to the second structure 3100S in the first structure 3100F.

In the first structure 3100F, the decoder circuit 3110 and the page buffer circuit 3120 may perform a control operation for at least one selected memory cell transistor among the plurality of memory cell transistors MCT. The decoder circuit 3110 and the page buffer circuit 3120 may be controlled by the logic circuit 3130. The semiconductor device 3100 may communicate with the controller 3200 through an input/output pad 3101 electrically connected to the logic circuit 3130. The input/output pad 3101 may be electrically connected to the logic circuit 3130 through an input/output connection wiring 3135 extending to the second structure 3100S in the first structure 3100F.

The controller 3200 may include a processor 3210, a NAND controller 3220, and a host interface 3230. The electronic system 3000 may include a plurality of semiconductor devices 3100, and in this case, the controller 3200 may control the plurality of semiconductor devices 3100.

The processor 3210 may control operations of the electronic system 3000 including the controller 3200. The processor 3210 may be operated by firmware, and may control the NAND controller 3220 to access the semiconductor device 3100. The NAND controller 3220 may include a NAND interface 3221 for communicating with the semiconductor device 3100. Through the NAND interface 3221, control command for controlling the semiconductor device 3100, data to be written in the memory cell transistors MCT of the semiconductor device 3100, data to be read from the memory cell transistors MCT of the semiconductor device 3100, etc., may be transferred. The host interface 3230 may provide communication between the electronic system 3000 and an outside host. When control command is received from the outside host through the host interface 3230, the processor 3210 may control the semiconductor device 3100 in response to the control command.

A nonvolatile memory device or a storage device according to example embodiments may be packaged using various package types or package configurations.

The inventive concepts may be applied to various electronic devices including a nonvolatile memory device. For example, the inventive concepts may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of example embodiments and is not to be construed as limiting thereof. Although certain illustrated embodiments have been described, those skilled in the art will readily appreciate that many modifications are possible in relation to the illustrated embodiments without materially departing from the scope of the inventive concept. Accordingly, all such modifications are intended to be included within the scope of the inventive concept as defined by the following claims.

What is claimed is:

1. A storage system comprising:
a host, wherein the host includes a host processor and a host memory buffer, wherein the host processor includes a central processing unit (CPU) core controlling operation of the host and includes a cache within the host processor, and the cache is dedicated to the CPU core, and wherein the host memory buffer includes a submission queue and a completion queue; and
a storage device connected to the host through a link, communicating with the host using a transaction layer packet (TLP), and including a nonvolatile memory device (NVM) and a storage controller controlling the NVM,
wherein the host is configured to write a nonvolatile memory express (NVMe) command indicating a destination to the submission queue,
wherein the storage controller is configured to read data from the NVM, directly access the cache in response to destination information associated with the destination, and store target data corresponding to data to be updated from among the read data in the cache,
wherein the storage controller includes:
a host interface connected to a physical layer of the host,
a command parser connected to the host interface, wherein the command parser is configured to generate the destination information by parsing the NVMe command,
a nonvolatile memory interface connected to the command parser and the NVM, wherein the nonvolatile memory interface is configured to read the data from the NVM by transmitting the NVMe command to the NVM, and
a first direct memory access (DMA) engine configured to receive the read data from the nonvolatile memory interface and receive the destination information from the command parser,
wherein the host interface is configured to receive the read data and the destination information from the first DMA engine, generate the TLP in response to the read data and the destination information, and transmit the TLP to the host through the link,
wherein the host further includes a root complex connected to the host processor and the host memory buffer,
wherein the root complex includes a second DMA engine, and wherein the second DMA engine is configured to provide the target data to the cache and provide non-target data from among the read data, excepting the target data, to the host memory buffer in response to the destination information.

2. The storage system of claim 1, wherein
the TLP includes a packet header, and the packet header includes: a format field indicating whether a prefix exists, a type field indicating a type of the TLP, a hint field indicating whether a TLP processing hint exists, and a processing hint field, and
the host interface is further configured to indicate the destination information using the processing hint field.

3. The storage system of claim 1, wherein the TLP includes a packet header, and the packet header includes: a format field indicating whether a prefix exists, a type field indicating a type of the TLP, a hint field indicating whether a TLP processing hint exists, and a processing hint field, and
the host interface is further configured to indicate the destination information using a steering tag field when the format field indicates that the prefix exists.

4. The storage system of claim 3, wherein the host interface is further configured to include the steering tag field in a seventh byte, among first through eighth bytes, of a memory write request header.

5. The storage system of claim 1, wherein the storage controller is configured to receive a notification associated with the NVMe command through doorbell signaling from the host, fetch the NVMe command from the submission queue, perform a read operation corresponding to the fetched NVMe command, write a completion command to the completion queue, and transmit an interrupt signal to the host.

6. The storage system of claim 5, wherein the storage controller is further configured to fetch the NVMe command by transmitting a memory read request to the host and receiving the NVMe command from the host.

7. The storage system of claim 5, wherein
the root complex is configured to provide the target data to the cache based on the destination information included in the TLP.

8. The storage system of claim 1, wherein, in response to a cache miss indicating data to be updated stored in the cache or in response to new data to be stored, wherein the new data is not stored in the cache or in the host memory buffer, the host processor is configured to set destination information in a portion of the NVMe command, and store the NVMe command in the submission queue.

9. The storage system of claim 8, wherein the NVMe command is an NVMe read command, and
wherein the host interface is configured to set the destination information in reserved bits of a fourteenth command double word, among first through sixteenth command double words of the NVMe read command, and set the destination information in a processing hint field and a steering tag field of the TLP.

10. A storage system comprising:
a host; and
a storage device connected with the host through a link, the storage device configured to communicate with the host using a transaction layer packet (TLP),
wherein the host comprises:
a host processor configured to control operation of the host, the host processor including a central processing unit (CPU) core and a cache within the host processor, and the cache is dedicated to the CPU core, wherein the cache is swapped based on a unit of a cache line; and a host memory buffer including a submission queue and a completion queue, wherein the storage device includes:
a nonvolatile memory device (NVM) configured to store data; and
a storage controller configured to control operation of the NVM, wherein, in response to a nonvolatile memory express (NVMe) command received from the host corresponding to a read command requesting a partial update of the cache, the storage controller is configured to read corresponding data from the NVM, provide the cache with target data corresponding to data to be updated from among the read data, and provide the host memory buffer with non-target data from among the read data, excepting the target data, wherein the storage controller includes:
a host interface connected to a physical layer of the host,
a command parser connected to the host interface, wherein the command parser is configured to generate bitmap information associated with a destination of the target data by parsing the NVMe command,
a nonvolatile memory interface connected to the command parser and the NVM, wherein the nonvolatile memory interface is configured to read data from the NVM by transmitting the NVMe command to the NVM, and
a first direct memory access (DMA) engine configured to receive the read data from the nonvolatile memory interface and receive the bitmap information from the command parser, wherein the host interface is configured to receive the read data and the bitmap information from the first DMA engine, generate the TLP in response to the read data and the bitmap information, and transmit the TLP to the host through the link, wherein the host further includes a root complex connected to the host processor and the host memory buffer, wherein the root complex includes a second DMA engine, and wherein the second DMA engine is configured to provide the target data to the cache and provide the non-target data to the host memory buffer in response to the bitmap information.

11. The storage system of claim 10, wherein the TLP includes a packet header, and a payload to store the read data, the packet header includes: a format field indicating whether a prefix exists, a type field indicating a type of the TLP, a hint field indicating whether a TLP processing hint exists, and a processing hint field indicating data access pattern, and the host interface is configured to indicate the bitmap information using a steering tag field when the format field indicates that the prefix exists.

12. The storage system of claim 11, wherein the host interface is further configured to include the steering tag field in a seventh byte, among first through eighth bytes, of a memory write request header.

13. The storage system of claim 10, wherein the cache includes a plurality of cache lines, and the host processor is further configured to swap the target data with at least one cache line among the plurality of cache lines.

14. The storage system of claim 10, wherein the cache includes a plurality of cache lines, the host processor is further configured to generate the NVMe command requesting the partial update in response to a data miss occurring in relation to at least one of the plurality of cache lines.

15. The storage system of claim 10, wherein the storage controller is further configured to receive a notification associated with the NVMe command through doorbell signaling from the host, fetch the NVMe command from the submission queue, perform a read operation in response to the fetched NVMe command, write a completion command to the completion queue, and transmit an interrupt signal to the host.

16. The storage system of claim 10, wherein the storage controller is further configured to communicate with the host using a NVMe interface, and the TLP conforms to a Peripheral Component Interconnect Express (PCIe)-based protocol.

17. A storage system comprising:
a host; and
a storage device connected with the host through a peripheral component interconnect express (PCIe) link, the storage device configured to communicate with the host using a transaction layer packet (TLP), wherein the host comprises:
a host processor configured to control an operation of the host, wherein the host processor includes a central processing unit (CPU) core and a cache within the host processor, and the cache is dedicated to the CPU core;
a host memory buffer including a submission queue; and
a root complex connected to the host processor and the host memory buffer, wherein the storage device includes:
at least one nonvolatile memory device (NVM) configured to store data; and
a storage controller configured to control the NVM, wherein, in response to a nonvolatile memory express (NVMe) command received from the host and a destination associated with the NVMe command corresponding to the cache, the storage controller is configured to read data from the NVM, access the cache through the root complex, and store the read data in the cache, wherein, in response to a cache miss indicating an update of data that is stored in the cache occurring or in response to a new data, which is not stored in the cache or in the host memory buffer, to be requested, the host processor is configured to set destination information associated with the destination in a portion of the NVMe command, and store the NVMe command in the submission queue, wherein the storage controller includes:
a host interface connected to a physical layer of the host,
a command parser connected to the host interface, wherein the command parser is configured to generate the destination information by parsing the NVMe command,
a nonvolatile memory interface connected to the command parser and the NVM, wherein the nonvolatile memory interface is configured to read the data from the NVM by transmitting the NVMe command to the NVM, and a first direct memory access (DMA) engine configured to receive the read data from the nonvolatile memory interface and receive the destination information from the command parser, wherein the host interface is configured to receive the read data and the destination information from the first DMA engine, generate the TLP in response to the read data and the destination information, and transmit the TLP to the host through the PCIe link, wherein the root complex includes a second DMA engine, and wherein the second DMA engine is configured to provide target data to the cache and provide non-target data from among the read data, excepting the target data, to the host memory buffer in response to the destination information.

\* \* \* \* \*